(12) United States Patent
Kosako et al.

(10) Patent No.: US 6,977,234 B2
(45) Date of Patent: Dec. 20, 2005

(54) METHOD FOR MANUFACTURING FUEL CELL ELECTROLYTE FILM-ELECTRODE BOND

(75) Inventors: Shinya Kosako, Nishinomiya (JP); Masato Hosaka, Osaka (JP); Makoto Uchida, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 232 days.

(21) Appl. No.: 10/240,433

(22) PCT Filed: Jan. 16, 2002

(86) PCT No.: PCT/JP02/00257

§ 371 (c)(1),
(2), (4) Date: Sep. 30, 2002

(87) PCT Pub. No.: WO02/058178

PCT Pub. Date: Jul. 25, 2002

(65) Prior Publication Data

US 2003/0158273 A1     Aug. 21, 2003

(30) Foreign Application Priority Data

Jan. 19, 2001  (JP) .............................. 2001-012338
Feb. 21, 2001  (JP) .............................. 2001-045572
Feb. 21, 2001  (JP) .............................. 2001-045615

(51) Int. Cl.⁷ ........................... H01M 4/88; B05D 5/12
(52) U.S. Cl. ....................... 502/101; 427/115; 156/230
(58) Field of Search ........................ 427/115; 502/101; 156/230

(56) References Cited

U.S. PATENT DOCUMENTS 5,211,984 A  *  5/1993  Wilson ....................... 427/115
5,972,054 A     10/1999  Yotsuyanagi et al.

FOREIGN PATENT DOCUMENTS

JP          48-88938        11/1973

(Continued)

OTHER PUBLICATIONS

Computer-generated English translation of JP 11-16,586 (Totsuka) Jan. 1999.*

(Continued)

*Primary Examiner*—Stephen J. Kalafut
(74) *Attorney, Agent, or Firm*—Akin Gump Strauss Hauer & Feld, LLP

(57) ABSTRACT

In order to obtain an electrolyte membrane-electrode assembly using a thin electrolyte membrane, the present invention provides a production method of an electrolyte membrane-electrode assembly comprising: a step of forming a hydrogen ion-conductive polymer electrolyte membrane on a base material; a treatment step of reducing adhesion force between the base material and the hydrogen ion-conductive polymer electrolyte membrane; a step of separating and removing the base material; and a step of bonding a catalyst layer and a gas diffusion layer onto the hydrogen ion-conductive polymer electrolyte membrane, and, in order to obtain an electrolyte membrane-electrode assembly which has a catalyst without clogging and is excellent in electrode characteristics, the present invention provides a production method of an electrolyte membrane-electrode assembly comprising: a step of bonding a hydrogen ion-conductive polymer electrolyte membrane and a catalyst layer via a coating layer; a step of removing the coating layer; and a step of obtaining an electrolyte membrane-electrode assembly by forming a gas diffusion layer on the catalyst layer.

19 Claims, 13 Drawing Sheets

FOREIGN PATENT DOCUMENTS

| | | |
|---|---|---|
| JP | 02-252600 A | 10/1990 |
| JP | 04-264367 A | 9/1992 |
| JP | 06-203849 A | 7/1994 |
| JP | 06-251779 A | 9/1994 |
| JP | 07-176317 A | 7/1995 |
| JP | 08-048946 A | 2/1996 |
| JP | 08-088011 A | 4/1996 |
| JP | 08-106915 A | 4/1996 |
| JP | 08-162132 A | 6/1996 |
| JP | 10-064574 A | 3/1998 |
| JP | 10-154521 A | 6/1998 |
| JP | 11-016586 A | 1/1999 |
| JP | 11-339824 A | 12/1999 |
| JP | 2000-133809 A | 5/2000 |
| JP | 2000-154354 A | 6/2000 |

OTHER PUBLICATIONS

Computer-generated English translation of JP 6-251,779 (Noaki et al.) Sep. 1994.*

Computer-generated English translation of JP 2000-133,809 (Utsunomiya) May 2000.*

* cited by examiner

FIG. 9
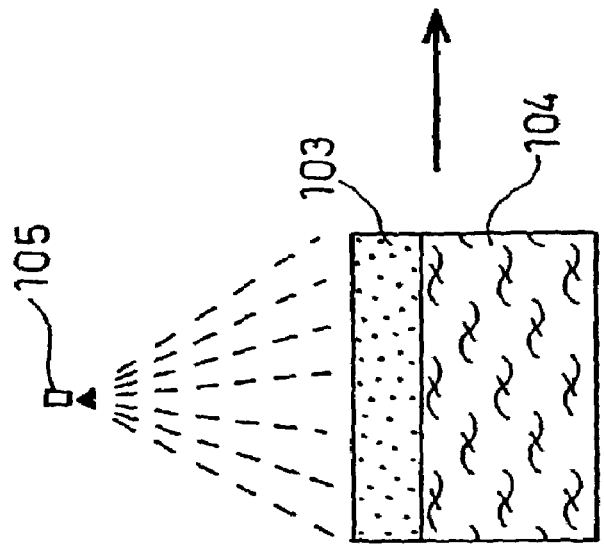
(a)
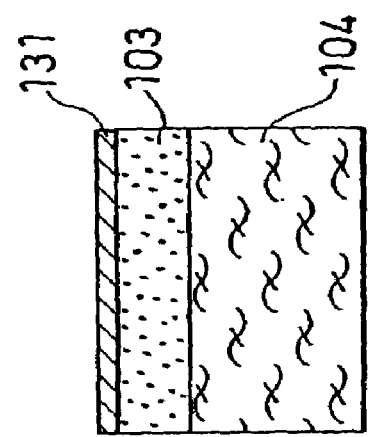
(b)
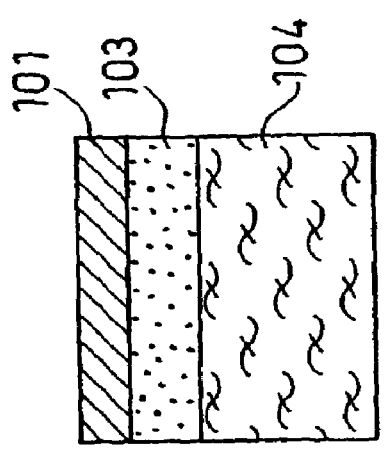
(c)

METHOD FOR MANUFACTURING FUEL CELL ELECTROLYTE FILM-ELECTRODE BOND

CROSS-REFERENCE TO RELATED APPLICATION

This application is a Section 371 of International Application No. PCT/JP02/00257, filed Jan. 16, 2002, the disclosure of which is incorporated herein by reference.

TECHNICAL FIELD

The present invention relates to an electrolyte membrane-electrode assembly used for a polymer electrolyte fuel cell.

BACKGROUND ART

An electrolyte membrane-electrode assembly used for a polymer electrolyte fuel cell (PEFC) is obtained by bonding a first gas diffusion electrode as an anode and a second gas diffusion electrode as a cathode to a film-shaped hydrogen ion-conductive polymer electrolyte membrane as an electrolyte. The gas diffusion electrode is composed of a gas diffusion layer and a catalyst layer, and the gas diffusion layer is constituted of porous carbon paper or the like. The catalyst layers of the anode and cathode are constituted of noble metal fine particles and carbon particles carrying these fine particles thereon.

As shown in FIG. 10(b), an electrolyte membrane-electrode assembly for the PEFC is obtained by bonding gas diffusion electrodes 146 and 147 to a film-shaped polymer electrolyte membrane 141 as the electrolyte. The polymer electrolyte membrane 141 is typically supplied with a roll.

FIG. 10(a) shows one example of production methods of the electrolyte membrane-electrode assembly, and herein, carbon paper (gas diffusion layers) 142 and 144 with catalyst layers 143 and 145 formed thereon are press-contacted with the polymer electrolyte membrane 141 by hot pressing. Another method is to form the catalyst layer on the polymer electrolyte membrane in advance by transfer-printing, printing or the like, and carbon paper is then press-contacted therewith.

In the catalyst layer 143 on the anode side, a reaction represented by the formula (1) occurs:

$$H_2 \rightarrow 2H^+ + 2e^- \tag{1},$$

while, in the catalyst layer 145 on the cathode side, a reaction represented by the formula (2) occurs:

$$\tfrac{1}{2}O_2 + 2H^+ + 2e^- \rightarrow H_2O \tag{2}$$

When the above reactions occur, protons (hydrogen ions) generated in the anode migrate to the cathode through the polymer electrolyte membrane 141.

Such a PEFC is required to generate a high output voltage, for which it is of necessity for a polymer electrolyte membrane used to have high proton conductivity, namely, to have low internal resistance. In order to obtain high proton conductivity, there are needs for the use of a material with high proton conductivity for the polymer electrolyte membrane and for the use of as thin a membrane as possible.

For a polymer electrolyte membrane in a typical PEFC used has been a polymer electrolyte membrane made of perfluorocarbon sulfonic acid ionomer, represented by Nafion 112 produced by Du Pont in the US, and a membrane having a thickness of about 30 to 50 μm has been put to practical use.

A polymer electrolyte membrane made of perfluorocarbon sulfonic acid ionomer which has higher proton conductivity than aforesaid Nafion may by exemplified by a Flemion S H membrane produced by Asahi Glass Co., Ltd.; however, there is a problem with this membrane that the membrane is more fragile and breakable than Nafion 112 because of containment of the sulfonic acid group therein. A membrane in practical use therefore has a thickness of not less than about 50 μm.

In order to make the polymer electrolyte membrane thinner, for example, Japanese Laid-Open Patent Publication No. Hei 08-162132 discloses a method in which a porous cloth made of polytetrafluoroethylene is used as a core member and in the porous part thereof, a polymer electrolyte resin is impregnated so as to form a polymer electrolyte membrane imparted with high intensity.

The examples of specific products produced by this method may include a GORE-SELECT membrane produced by JAPAN GORE-TEX INC. This type of membrane with a thickness of as thin as about 20 to 30 μm has been in practical use by using a reinforcing material.

Next, as for the production method of the electrolyte membrane-electrode assembly, there is a method in which an ink-like or paste-like mixture of the catalyst and the electrolyte, containing the catalyst, is applied onto the surface of the electrolyte membrane or of the gas diffusion layer by printing, spraying or the like. In either method, after application of the mixture, the electrolyte membrane and the gas diffusion electrode are bonded to each other by hot pressing or the like (e.g., Japanese Laid-Open Patent Publication No. Hei 6-203849, Japanese Laid-Open Patent Publication No. Hei 8-88011 and Japanese Laid-Open Patent Publication No. Hei 8-106915.)

There is another production method of the electrolyte membrane-electrode assembly, in which the catalyst layer formed on the base material in advance is transfer-printed to the electrolyte membrane by hot pressing or thermoroll (e.g., Japanese Laid-Open Patent Publication No. Hei 10-64574). This method is excellent from the viewpoints of control on and uniformity of the film thickness of the catalyst layer, production efficiency and cell performance.

However, the conventional production method comprises a step of handling the electrolyte membrane without using the base material for the electrolyte membrane. Thereby, when the electrolyte membrane with a film thickness less than 20 μm and lower intensity is used, for example, it has been extremely difficult to produce the electrolyte membrane-electrode assembly without breakage of the electrolyte membrane.

That is to say, when drawing stress or sheering stress is directly applied to the electrolyte membrane with a thin film thickness in the state that the base material for the electrolyte membrane is not present in the process of producing the electrolyte membrane-electrode assembly, defects such as a pinhole, breakage and crack easily occur. These defects cause occurrence of crossover of a fuel gas and air or of short-circuit in the electrolyte membrane-electrode assembly, raising a problem of significant deterioration of performance of the PEFC.

Moreover, since the polymer electrolyte having high proton conductivity such as perfluorocarbon sulfonic acid ionomer contains a hydrophilic group such as the sulfonic acid group in the molecular chain, ionomer soluble to water tends to gradually flow into the gas diffusion layer such as carbon paper in operation of the fuel cell. For this reason, there has been a problem that a reaction area of a triphasic interface, formed of a pore as a supply channel of a reaction gas, a polymer electrolyte having proton conductivity due to containment of water and an electrode material as an electron conductor, gradually becomes smaller, decreasing cell output. Further, there has been another problem that, when a current collector having a gas flow channel arranged in the outside of the assembly of the polymer electrolyte membrane and the electrode is made of metal, the assembly is gradually corroded with dissolved acidic ionomer, significantly lowering reliability of the fuel cell.

In order to solve the above problems, therefore, it is an object of the present invention to provide an electrolyte membrane-electrode assembly for a polymer electrolyte fuel cell with low internal resistance and of great power, which can use perfluorocarbon sulfonic acid ionomer having high proton conductivity and comprises a thin polymer electrolyte membrane capable of being formed on a catalyst layer.

It is also an object of the present invention to provide an electrolyte membrane-electrode assembly for a polymer electrolyte fuel cell, which has a uniform film thickness to cause no clogging in the porous part of the catalyst layer of the gas diffusion electrode by preventing soakage of the raw material solution of the polymer electrolyte membrane into the porous part, thereby having excellent electrode properties.

It is further an object of the present invention to provide an electrolyte membrane-electrode assembly using a polymer electrolyte having high proton conductivity and exhibiting excellent durability and high performance, and a polymer electrolyte fuel cell constituted using this assembly.

DISCLOSURE OF INVENTION

The present invention relate to a production method of an electrolyte membrane-electrode assembly for a polymer electrolyte fuel cell, comprising: a gas diffusion electrode having a gas diffusion layer and a catalyst layer; and a hydrogen ion-conductive polymer electrolyte membrane bonded to the gas diffusion electrode, the method being characterized by comprising: a step of forming a hydrogen ion-conductive polymer electrolyte membrane on a base material; a treatment step of reducing adhesion force between the base material and the hydrogen ion-polymer electrolyte membrane; a step of separating and removing the base material; and a step of bonding a catalyst layer and a gas diffusion layer onto the hydrogen ion-conductive polymer electrolyte membrane.

It is preferable that the production method comprises a step of transfer-printing a membrane at least one time and the hydrogen ion-conductive polymer electrolyte membrane is supported by the base material until an electrolyte membrane-electrode assembly is obtained.

It is also preferable that the production method comprises: a step (1) of forming a hydrogen ion-conductive polymer electrolyte membrane on a first base material and a second base material; a step (2) of forming a catalyst layer on the hydrogen ion-conductive polymer electrolyte membrane formed on the base material; a step (3) of attaching by pressure and bonding a gasket and a gas diffusion layer onto the hydrogen ion-conductive polymer electrolyte membrane and the catalyst layer on the base material; a step (4) of separating and removing the base material to obtain a first semi-assembly and a second-semi assembly; and a step (5) of attaching by pressure the first semi-assembly to the second semi-assembly while the hydrogen ion-conductive polymer electrolyte membranes thereof are mutually opposed to obtain an electrolyte membrane-electrode assembly, and the method further comprises, between the steps (1) and (4), a treatment step of reducing adhesion force between the base material and the hydrogen ion-conductive polymer electrolyte membrane.

It is also preferable that the production method comprises: a step (I) of forming a catalyst layer on a first base material and a second base material; a step (II) of forming a hydrogen ion-conductive polymer electrolyte membrane on the catalyst layer such that the membrane covers the catalyst layer formed on the base material and on the periphery of the catalyst layer; a step (III) of attaching by pressure the first base material to the second base material while the hydrogen ion-conductive polymer electrolyte membranes thereof are mutually opposed to obtain a pre-assembly; a step (IV) of separating and removing the first base material from the pre-assembly; a step (V) of attaching by pressure a gas diffusion layer and a gasket onto the catalyst layer and the hydrogen ion-conductive polymer electrolyte membrane which are exposed by the step (IV); a step (VI) of separating and removing the second base material from the pre-assembly; and a step (VII) of attaching by pressure a gas diffusion layer and a gasket onto the catalyst layer and the hydrogen ion-conductive polymer electrolyte membrane which are exposed by the step (VI) to obtain an electrolyte membrane-electrode assembly, and the method comprises, between the steps (II) and (IV) and/or between the steps (IV) and (VII), a treatment step of reducing adhesion force between the base material and the hydrogen ion-conductive polymer electrolyte membrane.

It is also preferable that the step of forming a hydrogen ion-conductive polymer electrolyte membrane on a base material is a step of transfer-printing a hydrogen ion-conductive polymer electrolyte membrane formed on a base material for transfer-printing, to the base material.

It is also preferable that the surface or the whole of the base material is constituted of a material which reduces the adhesion property to the hydrogen ion-conductive polymer electrolyte membrane by heating, or a material which evaporates or sublimates by heating, and the treatment step is a step of heating the base material.

It is also preferable that the surface or the whole of the base material is constituted of a material which reduces the adhesion property to the hydrogen ion-conductive polymer electrolyte membrane by cooling, and the treatment step is a step of cooling the base material.

It is also preferable that the surface or the whole of the base material is constituted of a material which reduces the adhesion property to the hydrogen ion-conductive polymer electrolyte membrane by irradiating active light rays, or a material which evaporates or sublimates by irradiating active light rays, and the treatment step is a step of irradiating the base material with active light rays.

It is further preferable that the base material comprises on the surface thereof an adhesion layer capable of dissolving in a solvent, and the treatment step is a step of bringing the base material in contact with a solvent.

It is also preferable that the treatment step is a step of depressurizing or pressurizing the face of the base material opposite to the face thereof with the hydrogen ion-conductive polymer electrolyte membrane formed.

It is further preferable that the production method comprises a step of arranging a reinforcing film made of a frame-shaped hydrogen ion-conductive film or gas diffusive film, between the hydrogen ion-conductive polymer electrolyte membrane and the catalyst layer, between the catalyst layer and the gas diffusion layer or between the hydrogen ion-conductive polymer electrolyte membranes, in a clearance between the gasket and the gas diffusion electrode in order to reinforce the hydrogen ion-conductive polymer electrolyte membrane.

The present invention further relates to a production method of an electrolyte membrane-electrode assembly for a polymer electrolyte fuel cell, the electrolyte membrane-electrode assembly having: a hydrogen ion-conductive polymer electrolyte membrane; and a gas diffusion electrode which contains a catalyst layer and a gas diffusion layer and is bonded to both faces of the hydrogen ion-conductive polymer electrolyte membrane, the method being characterized by comprising: a step of bonding a hydrogen ion-conductive polymer electrolyte membrane and a catalyst layer via a coating layer; a step of removing the coating layer; and a step of obtaining an electrolyte membrane-electrode assembly by forming a gas diffusion layer on the catalyst layer.

It is preferable that the method comprises: a step (a1) of forming a coating layer on a catalyst layer; a step (b1) of applying a hydrogen ion-conductive polymer electrolyte solution onto the coating layer; a step (c1) of removing the coating layer to obtain an electrolyte membrane-catalyst layer assembly; and a step (d1) of forming a gas diffusion layer on the catalyst layer.

It is preferable that the production method comprises: a step (a2) of forming a hydrogen ion-conductive polymer electrolyte membrane on a polymer film; a step (b2) of arranging a catalyst layer on the polymer film; a step (c2) of removing the polymer film to obtain an electrolyte membrane-catalyst layer assembly; and a step (d2) of forming a gas diffusion layer on the catalyst layer.

It is also preferable that the method comprises: a step (a3) of forming a coating layer containing a hydrogen ion-conductive polymer electrolyte on a catalyst layer; a step (b3) of applying a hydrogen ion-conductive polymer electrolyte solution onto the coating layer; a step (c3) of removing the coating layer to obtain an electrolyte membrane-catalyst layer assembly; and a step (d3) of forming a gas diffusion layer on the catalyst layer.

BRIEF DESCRIPTION OF DRAWINGS

FIG. 9 is a vertical sectional view representing the production process of the electrolyte membrane-electrode assembly for a fuel cell in Example 5.

Figure 1:
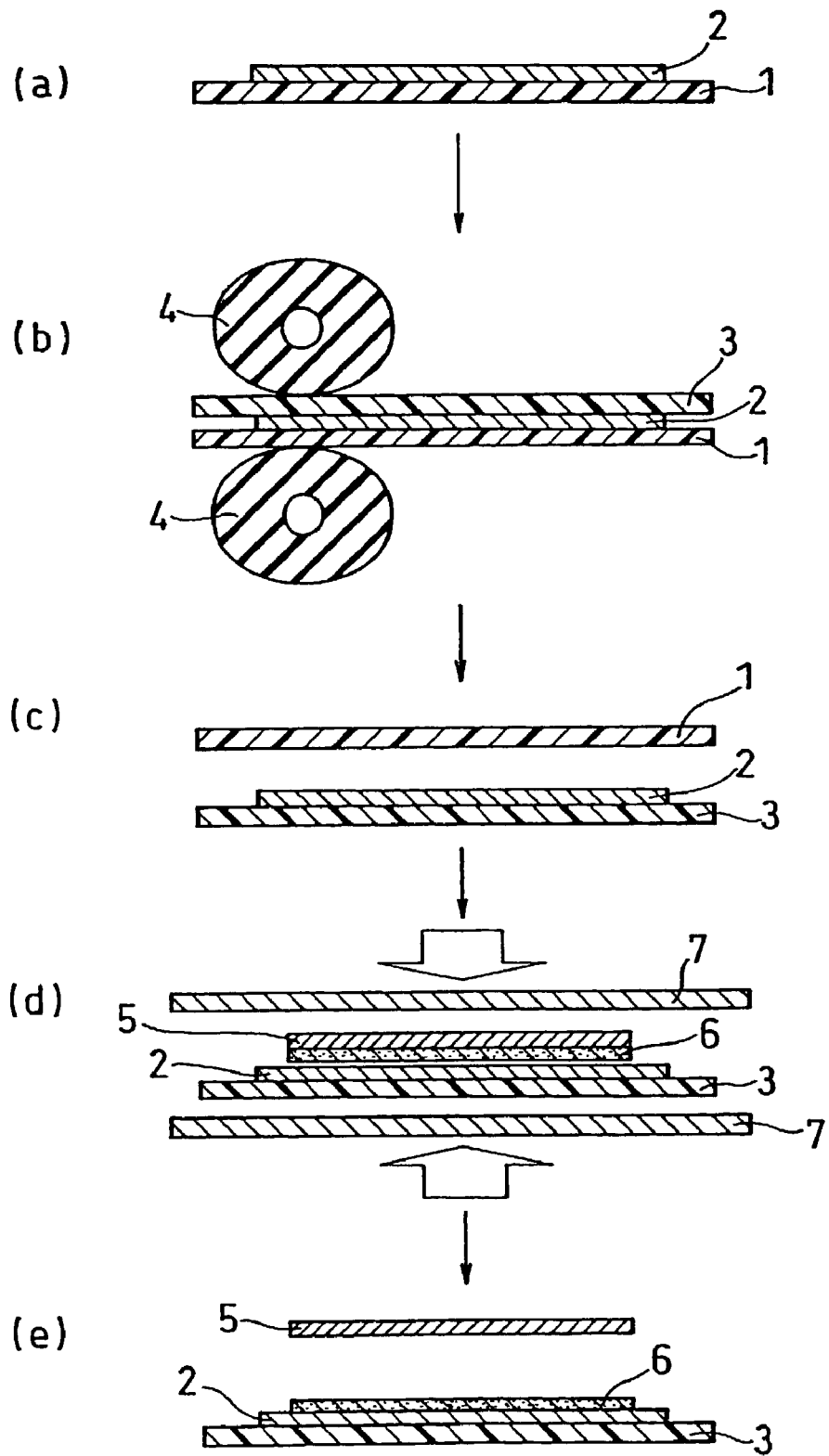
FIG. 1 is a vertical sectional view representing a step of forming an electrolyte membrane and a step of forming a catalyst layer in accordance with one embodiment of the present invention.

BEST MODE FOR CARRYING OUT THE INVENTION (1) First Production Method:

The present invention firstly relates to a production method of an electrolyte membrane-electrode assembly for a polymer electrolyte fuel cell, comprising: a gas diffusion electrode having a gas diffusion layer and a catalyst layer; and a hydrogen ion-conductive polymer electrolyte membrane bonded to the gas diffusion electrode, characterized by comprising: a step of forming a hydrogen ion-conductive polymer electrolyte membrane on a base material for the electrolyte membrane (hereinafter also referred to as, simply, "base material"); a treatment step of reducing adhesion force between the base material and the hydrogen ion-polymer electrolyte membrane; a step of separating and removing the base material; and a step of bonding a catalyst layer and a gas diffusion layer onto the hydrogen ion-conductive polymer electrolyte membrane.

According to the present invention, even when an electrolyte membrane with a thin film thickness is used, it is possible to produce the electrolyte membrane-electrode assembly without breakage of the electrolyte membrane.

First, in the production method of the present invention, the electrolyte membrane is formed on the base material either by forming the electrolyte membrane directly on the base material by a solvent casting method or the like or by transfer-printing the electrolyte membrane produced on the base material for transfer-printing onto the base material for the electrolyte membrane. The electrolyte membrane can thereby be handled in the state of being carried by the base material, from a step of forming the electrolyte membrane through a step of bonding and integrating the base material having the electrolyte membrane and the catalyst layer formed on the electrolyte membrane, and cell members including a gas diffusion layer and a gasket.

Furthermore, in a step of separating and removing the base material from the assembly of the cell members and the base material with the electrolyte-catalyst layer formed, each of the cell members attached by pressure serves to support and protect the electrolyte membrane. Also in a step of producing an electrolyte membrane-electrode assembly with an anode and a cathode arranged by attaching by pressure the respective electrolyte membranes of the two semi-assemblies of the electrolyte membrane and the electrode as thus constituted (a first semi-assembly and a second semi-assembly) to each other, each of the cell members thus attached by pressure plays the role of the base material in protecting the electrolyte membrane.

Moreover, in the production method of the present invention, after formation of the catalyst layer on the base material, the electrolyte membrane is formed on the catalyst layer and on the base material being on the periphery of the catalyst layer. Subsequently, the respective faces on the electrolyte membrane side of the two base materials, on which the catalyst layer and the electrolyte membrane have been formed, are mutually opposed to be attached by pressure to each other so as to form an assembly. In each of these steps, each electrolyte membrane is handled as being supported by the base material. One base material is then separated and removed from this assembly and the cell members including the gas diffusion layer and the gasket are bonded to the face on the catalyst layer side exposed due to the separation and removal. In each of these steps, each electrolyte membrane is supported by the other base material. After attachment by pressure of the cell members, in each of the steps from separation and removal of the other base material to completion of the polymer membrane electrode assembly, each of the cell members thus attached by pressure serves to support and protect the electrolyte membrane.

In this manner, according to the production method of the present invention, the electrolyte membrane is at all times protected by the base material, or the base material for transfer-printing or the cell members, which have the corresponding role to the base material. Even in a case where an electrolyte membrane with weak mechanical strength by reason that the film thickness thereof is thin or the like is used, accordingly, an electrolyte membrane-electrode assembly and a PEFC using the same can be produced without causing damage to the electrolyte membrane. Namely, according to the present invention, because stress applied to the electrolyte membrane by printing, transfer-printing, hot pressing or the like in the production process of the electrolyte membrane-electrode assembly is absorbed by the base material, the cell members playing the corresponding role to the base material or the like, large stress is not applied to the electrolyte membrane, and hence does not cause damage to the electrolyte membrane even when it is with law intensity.

In the production method of the present invention, at least anywhere between the step of forming the electrolyte membrane on the base material and the step of separating and removing the base material, between the step of forming the electrolyte membrane and the step of separating and removing one base material, and between the step of separating and removing one base material and the step of separating and removing the other base material, it is necessary to conduct a treatment step for decreasing adhesion force between the base material and the electrolyte membrane. As for such a treatment step, effective treatment steps may include, for example, irradiation of active light rays such as ultraviolet rays, X-rays, gamma rays or electron rays, heating, cooling, contact with a solvent or application of a pressure difference by the use of vapor.

(i) Embodiment 1

Embodiment 1 for the production method of an electrolyte membrane-electrode assembly in the present invention will be described by means of FIGS. 1 to 3: FIG. 1 shows steps of sequentially forming an electrolyte membrane 2 and a catalyst layer 6 on a base material 3. First, a hydrogen ion-conductive polymer electrolyte solution is applied to a base material 1 for transfer-printing with a coater, followed by drying, to form the electrolyte membrane 2 on the base material 1 for print-transfer, as in FIG. 1(a). Subsequently, as in FIG. 1(b), the other base material 3 capable of decreasing adhesion force of the surface is attached by pressure to the electrolyte membrane 2 on the base material 1 for transfer-printing with a laminating machine 4 such that the air does not get in the respective bonding parts. Next, as in FIG. 1(c), the base material 1 for transfer-printing is separated and removed from the electrolyte membrane 2, and the electrolyte membrane 2 is transfer-printed onto the base material 3.

Further, as in FIG. 1(d), the electrolyte membrane 2 transfer-printed onto the base material 3 and a catalyst layer 6 formed on the base material 5 for the catalyst layer are piled to be attached by pressure to each other with the use of a hot pressing machine 7. The base material 5 for the catalyst layer is then separated from the catalyst layer 6, and as in FIG. 1(e), the catalyst layer 6 is transfer-printed onto the electrolyte membrane 2. As thus described, since the electrolyte membrane 2 is supported by the base material 1 for transfer-printing in the steps of FIGS. 1(a) and (b) and it is supported by the base material 3 for the electrolyte membrane in each of the steps FIGS. 1(c) to (e), it should not sustain damage.

While FIG. 1 shows the example of forming the electrolyte membrane 2 by the transfer-printing method, it is also possible to form the electrolyte membrane 2 directly on the base material 3 by a solvent casting method in which an electrolyte solution is applied onto the base material 3, followed by drying.

Figure 2:
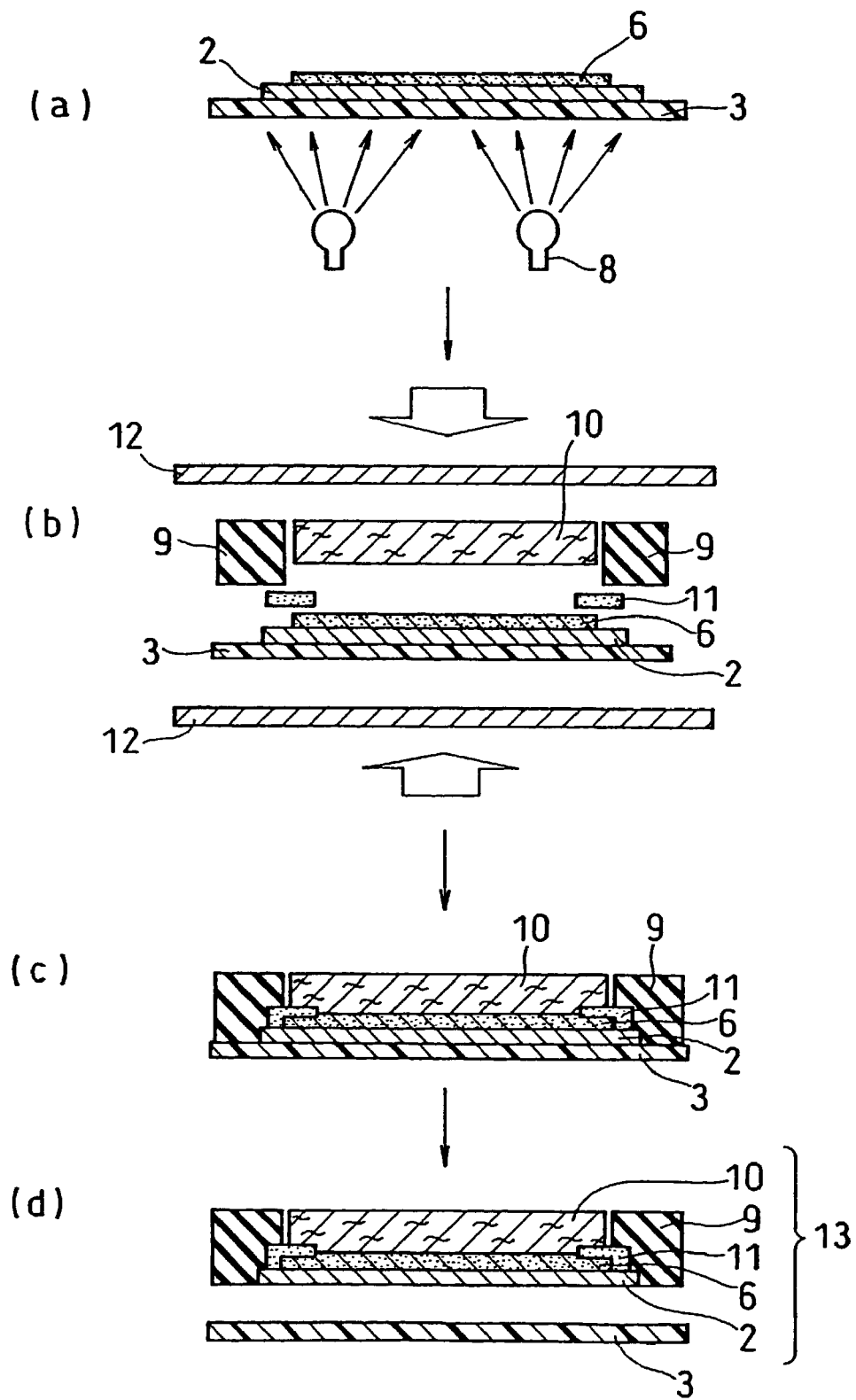
FIG. 2 is a vertical sectional view representing steps subsequent to the steps in FIG. 1 until separation and removal of a base material for the electrolyte membrane.

Next, FIG. 2 shows steps from formation of the catalyst layer 6 on the electrolyte membrane 2 to separation and removal of the base material 3 from the electrolyte membrane 2. First, as in FIG. 2(a), ultraviolet rays are irradiated with an ultraviolet lamp 8 from the back face of the base material 3 on which the electrolyte membrane 2 and the catalyst layer 6 have been formed. By a treatment step such as ultraviolet irradiation, it is possible to get rid of most of the adhesion force between the electrolyte membrane 2 and the base material 3 generated in forming the electrolyte membrane 2 on the base material 3 by the transfer-printing method, the solvent casting method or the like.

Then, as in FIG. 2(b), a gas diffusion layer 10 repellent-treated in advance, a gasket 9 and a hydrogen ion-conductive film 11 are arranged on the base material-electrolyte membrane-catalyst layer assembly having been irradiated with ultraviolet rays and then these materials are attached by pressure with the use of a hot pressing machine 12 to be integrated as in FIG. 2(c). In the above steps of FIGS. 2(a) to (c), the electrolyte membrane 2 sustains no damage as being supported by the base material 3. Thereafter, the base material 3 is separated from the base material 2 as in FIG. 2 (d) to obtain a semi-assembly 13 of the electrolyte membrane and the electrode.

In the step of FIG. 2(d), the electrolyte membrane 2 adheres to the cell members including the gas diffusion layer 10, the gasket 9 and the hydrogen ion-conductive film 11 processed to be frame-shaped, to be integrated. For this reason, stress applied to the base material 2 in separating the base material 3 is alleviated by these cell members. As thus described, in addition to support and protection for the base material 2 by these cell members, adhesion force to the base material 3 has been decreased by the aforesaid treatment step, thereby facilitating separation of the base material 3 without causing any damage to the electrolyte membrane 2 to obtain the semi-assembly 13 of the electrolyte membrane-electrode.

Even when the aforesaid treatment for decreasing adhesion force is conducted on the base material 3 with the electrolyte membrane 2 and the catalyst layer 6 formed thereon as in FIG. 2(*a*), or even when the treatment is conducted, for example, on the base material 3 after being integrated with the cell members as in FIG. 2(*c*), the similar effects can be obtained. A gas diffusive film may be used in place of the hydrogen ion-conductive film 11. When the gas diffusion layer 10 and the gasket 9 as the cell members are attached by pressure to the base material-electrolyte membrane-catalyst layer assembly, the electrolyte membrane 2 is almost thoroughly supported by these materials. Simultaneous attachment by pressure of the hydrogen ion-conductive film 11 or the gas diffusive film results in an increased effect of protecting the electrolyte membrane, especially in the vicinity of the gap between the gasket and the gas diffusion electrode.

Figure 3:
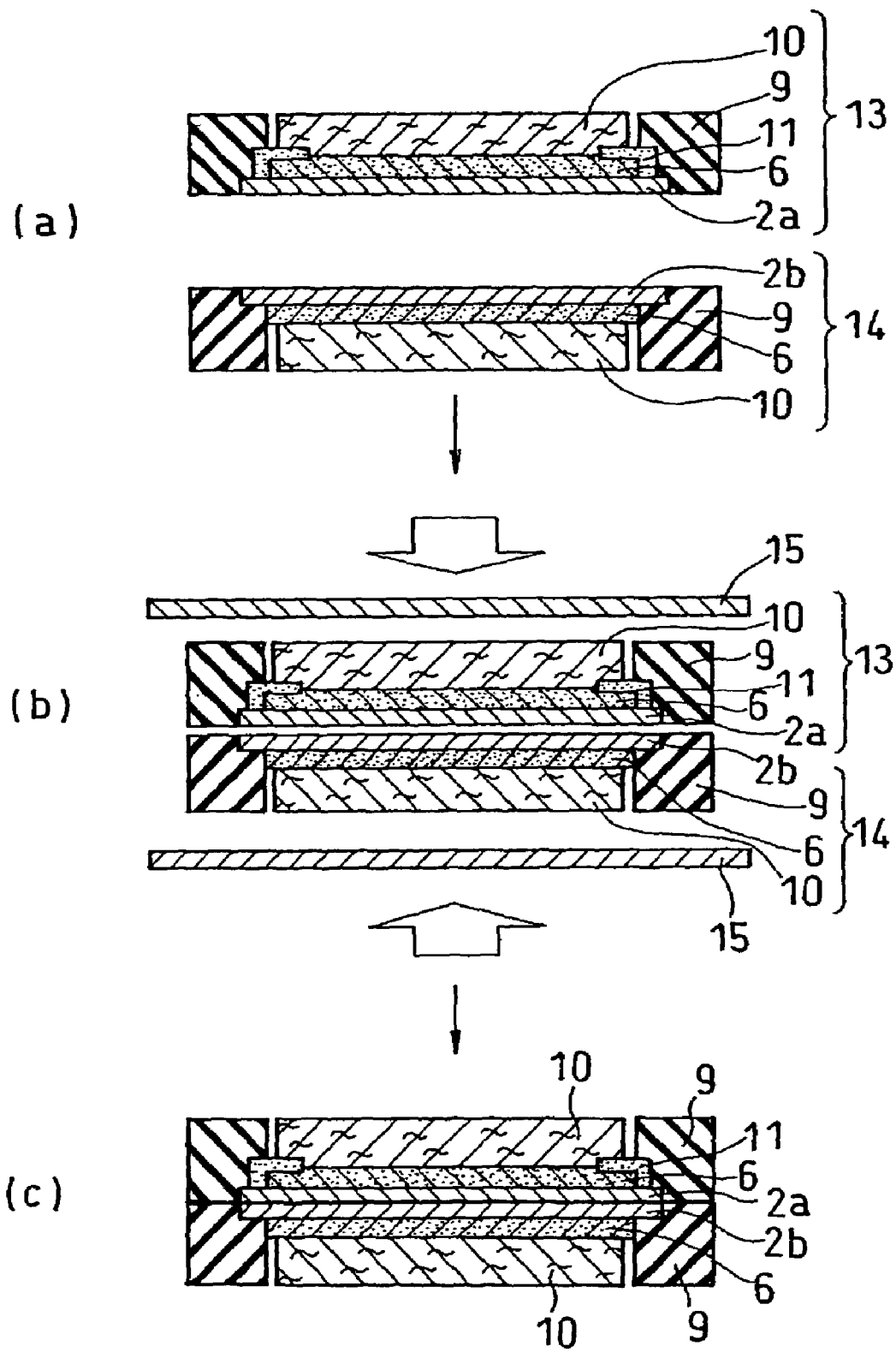
FIG. 3 is a vertical sectional view representing steps subsequent to the steps in FIG. 2 until constitution of an electrolyte membrane-electrode assembly.

FIG. 3 shows steps of producing an electrolyte membrane-electrode assembly by integrating the first semi-assembly 13 of the electrolyte membrane-electrode and a second semi-assembly 14 without the hydrogen ion-conductive film 11 being attached by pressure thereto as thus produced. The respective electrolyte membranes 2*a* and 2*b* of the semi-assemblies 13 and 14 are mutually opposed as in FIG. 3(*a*), which are then attached by pressure to each other with the use of a hot pressing machine 15 as in FIG. 3(*b*). Thereby, the electrolyte membrane-electrode assembly as shown in FIG. 3(*c*) can be obtained. Further, the assembly is stood still in a depressurized container for 10 minutes for deaeration of the assembly.

In the aforesaid case, two of the semi-assemblies 14 without hydrogen ion-conductive film 11 being attached by pressure thereto may be attached by pressure to each other with the frame-shaped hydrogen ion-conductive film 11 or the gas diffusive film interposed therebetween to produce the electrolyte membrane-electrode assembly. It is thereby possible to obtain the effect of protecting the electrolyte membrane in the vicinity of the gap between the gasket and the gas diffusion electrode.

(ii) Embodiment 2

Figure 4:
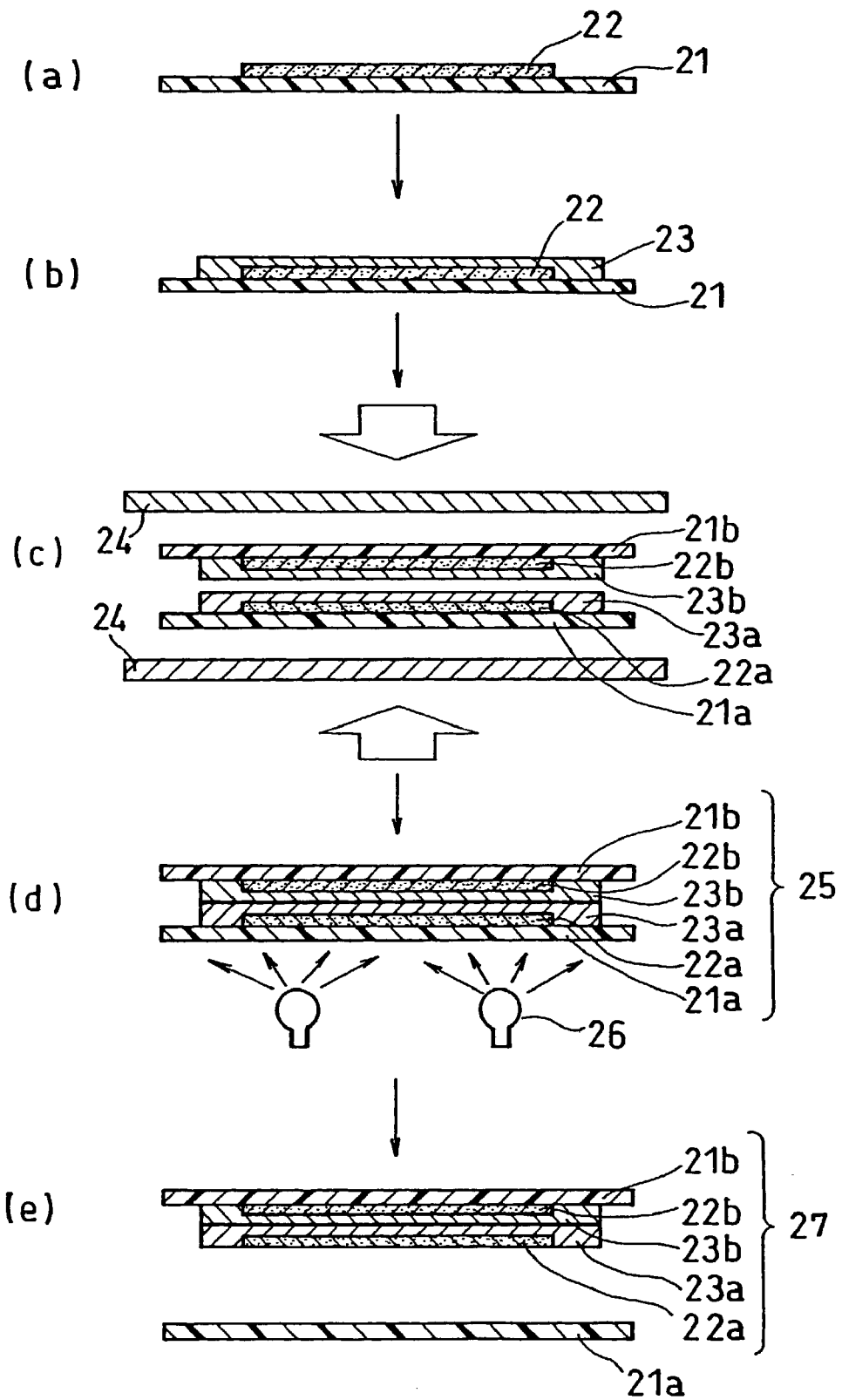
FIG. 4 is a vertical sectional view representing steps from formation of the catalyst layer to separation and removal of one electrolyte membrane base material in another embodiment of the present invention.

An embodiment of a second production method of the present invention will be described by means of FIGS. 4 to 6:

FIG. 4 shows steps from formation of a catalyst layer 22 on a base material 21 for an electrolyte membrane to separation and removal of a base material 21*a*, which is one of two base materials 21*a* and 21*b* (semi-assemblies) with the catalyst layer 22 and the electrolyte membrane 23 formed thereon, from an assembly obtained by attachment by pressure of respective electrolyte membranes 23*a* and 23*b* of the base materials 21*a* and 21*b*.

First, the catalyst layer 22 is formed on the base material 21 as in FIG. 4(*a*). The electrolyte membrane 23 is then formed over the area from the surface of the catalyst layer 22 to the surface of the base material 21 outside the catalyst layer 22, as in FIG. 4(*b*). In this case, to the formation method of the electrolyte membrane 23 applied may be either a method of forming it directly on the base material 21 with the catalyst layer 22 formed thereon or a method of transfer-printing the electrolyte membrane produced in advance on the base material for transfer-printing onto the base material 21.

Subsequently, the respective electrolyte membranes 23*a* and 23*b* of the two base materials 21*a* and 21*b* with the catalyst layer 22 and the electrolyte membrane 23 formed thereon are mutually opposed as in FIG. 4(*c*), which are then attached by pressure and bonded to each other with the use of a hot pressing machine 24 to obtain a pre-assembly 25. Then, the pre-assembly 25 is irradiated with ultraviolet rays by an ultraviolet lamp 26 from one face thereof, as in FIG. 4(*d*). In each of the above steps FIGS. 4(*a*) to (*d*), each of the electrolyte membranes 23*a* and 23*b* sustains no damage as being supported by the respective base materials 21*a* and 21*b* thereof.

Next, as in FIG. 4(*e*), the base material 21*a* is separated from the pre-assembly 25. In this case, a treatment step such as ultraviolet irradiation allows elimination of most of the adhesion force between one base material 21*a* and the electrolyte membrane 23*a*, and because the electrolyte membrane 23*a* is supported by the base material 21*b*, it is possible to separate the base material 21*a* with ease without causing any damage to the electrolyte membrane 23*a*.

Figure 5:
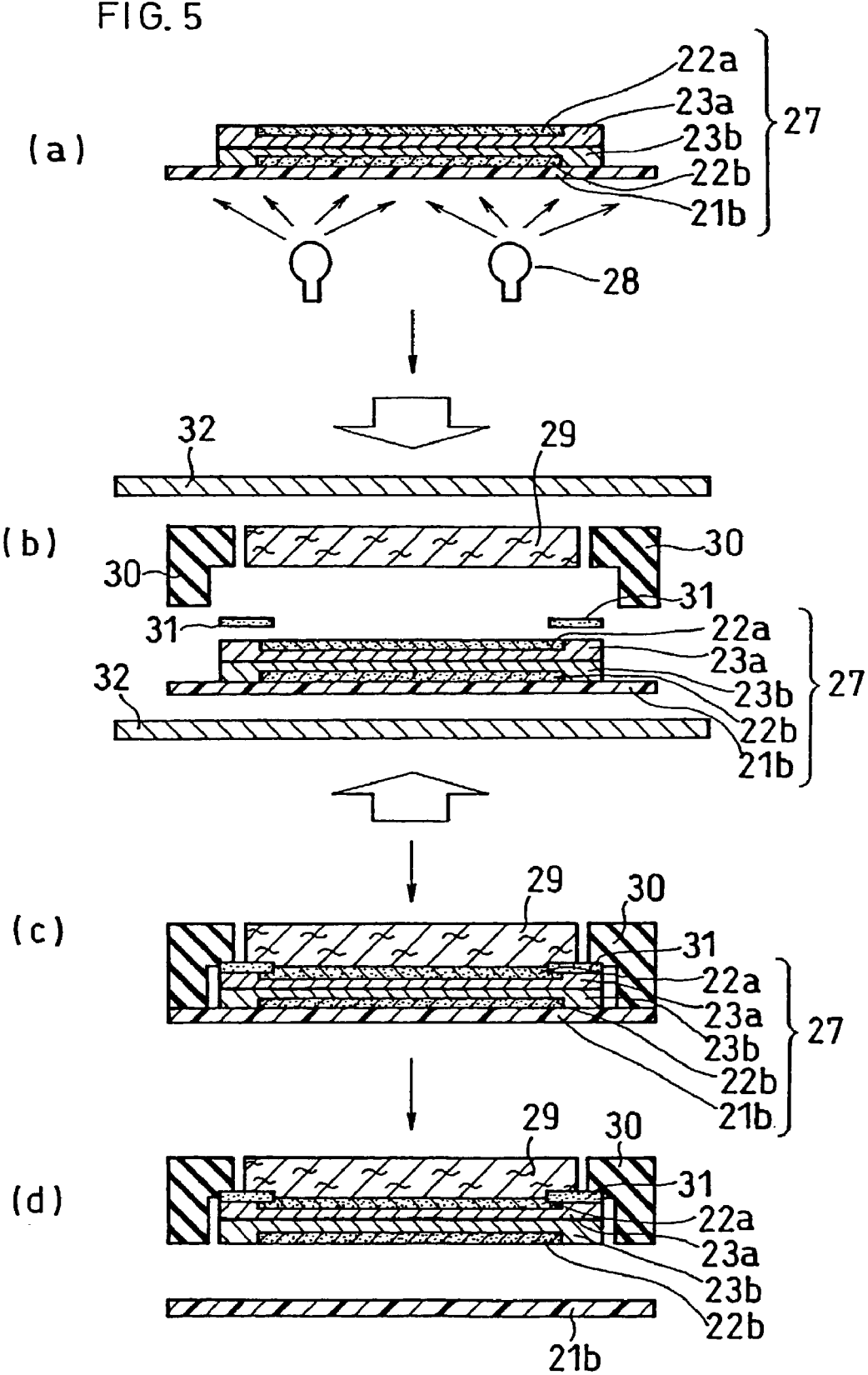
FIG. 5 is a vertical sectional view representing steps subsequent to the steps in FIG. 4 until separation and removal of the other electrolyte membrane base material.

FIG. 5 shows steps of separation and removal of one base materials 21*a* from the pre-assembly 25 to separation and removal of the other base materials 21*b* from the same.

First, as in FIG. 5(*a*), a pre-assembly 27, from which the base material 21*a* has been separated, is irradiated with ultraviolet rays with an ultraviolet lamp 28 from the side of the other base material 21*b*. Subsequently, the cell members including a gas diffusion layer 29, a gasket 30 and a frame-shaped gas diffusive film 31 are piled on the face on the side where the layer 22*a* and the electrolyte membrane 23*a* of the assembly 27 irradiated with ultraviolet rays are exposed, which are then attached by pressure with a hot pressing machine 32 to be integrated as in FIG. 5(*c*). In each of the steps FIGS. 5(*a*) to (*c*), the electrolyte membranes 23*a* and 23*b* sustain no damage as being supported by the base material 21*b* or by the cell members 29 to 31 attached by pressure.

Next, as in FIG. 5(*d*), the other base material 21*b* is separated from the integrated matter as in FIG. 5(*c*). In this case, adhesion force between the electrolyte membrane 23*b* and the base material 21*b* has been decreased due to the ultraviolet irradiation and, further, the electrolyte membrane 23*b* is supported by each of the cell members attached by pressure so that the base material 21*b* can be easily separated and removed without causing damage to the electrolyte membrane 23*b*. The treatment such as ultraviolet irradiation to decrease adhesion force between the electrolyte membrane and the base material has the similar effect even when conducted after integration of the cell members with a pre-assembly 27 irradiated with ultraviolet rays, as in FIG. 5(*c*).

Figure 6:
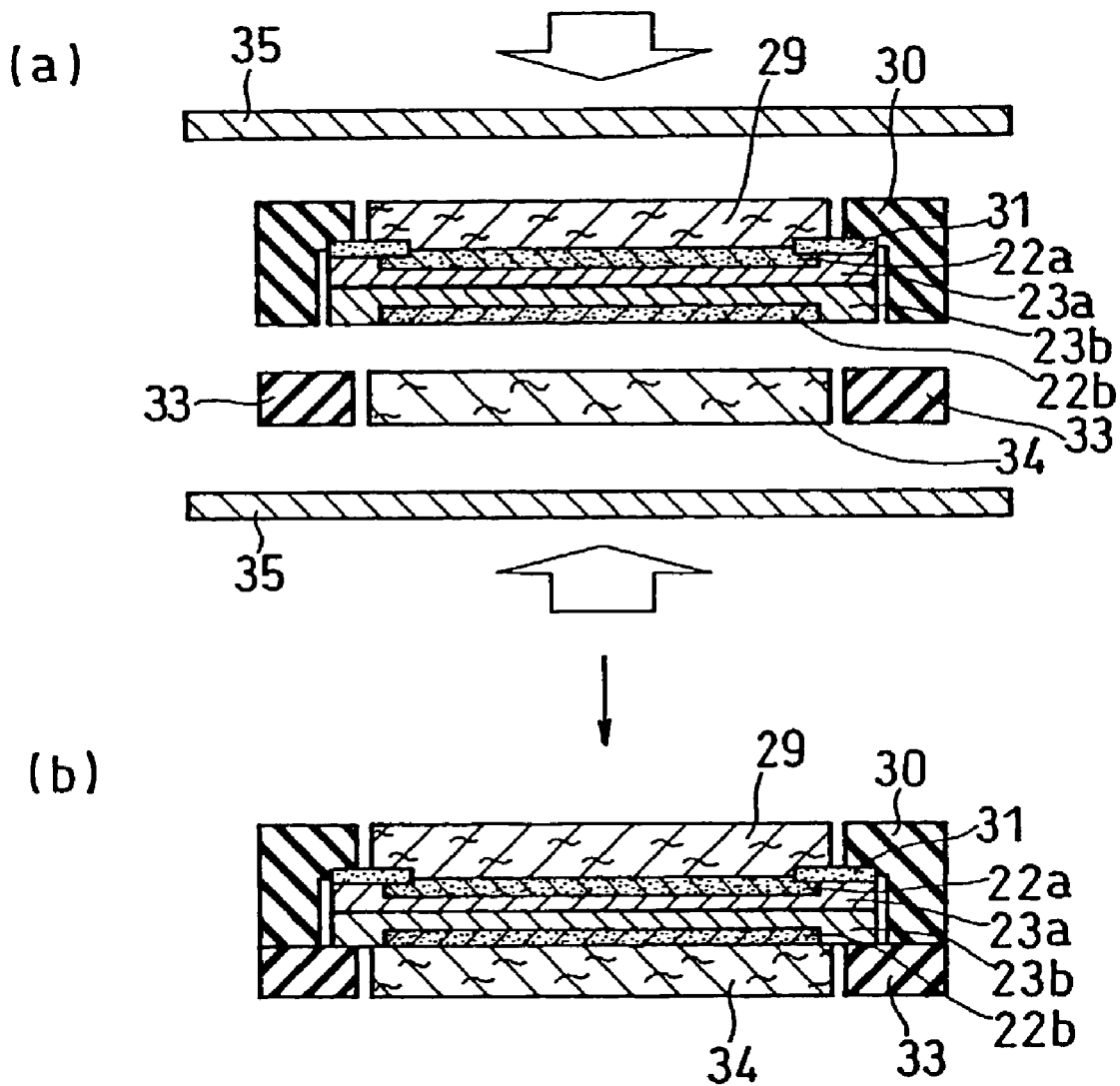
FIG. 6 is a vertical sectional view representing steps subsequent to the steps in FIG. 5 until constitution of an electrolyte membrane-electrode assembly.

FIG. 6 shows steps for completion of the electrolyte membrane-electrode assembly in accordance with the present invention. As shown in FIG. 6(*a*), on the face where the catalyst layer 22*b* and the electrolyte membrane 23*b* of the assembly (FIG. 5(*d*)), obtained by integrating the electrolyte membranes 23*a*, 23*b* and the cell members 29 to 31, are exposed, a gasket 33 and a repellent-treated gas diffusion layer 34 are piled and attached by pressure with a hot pressing machine 35 to constitute an electrolyte membrane-electrode assembly as in FIG. 6(*b*).

In the production method in accordance with Embodiment 2 of the present invention, as in the production method of Embodiment 1, the essential as the cell members to be integrated are the gas diffusion layer and the gasket. Further, it is preferable that the frame-shaped gas diffusive film or the hydrogen ion-conductive film is integrated.

In the production methods of Embodiments 1 and 2 of the present invention, when the electrolyte membrane is transfer-printed to the base material, it is necessary to make adhesion force between the base material and the electrolyte membrane larger than that between the base material for transfer-printing and the electrolyte membrane, or to be able to change adhesion force between the base material and the electrolyte membrane to be smaller when the electrolyte membrane is formed on the base material, to a degree that the electrolyte membrane can be separated and removed with ease by the treatment step after formation of the electrolyte membrane.

As for the material for the electrolyte membrane base material which can make adhesion force to the electrolyte membrane smaller by the treatment step by heating, for example, a heat-separating sheet (e.g., "River Alpha" No. 3198LS, No. 3198MS, No. 3198HS etc. produced by NITTO DENKO CORPORATION), or the like can be used. This is made by applying a heat-separative adhesive onto a substrate sheet made of polyester. It is further effective that a sheet material having formed a layer which sublimates by heat on the surface of the base material is used. The examples of the material which sublimates by heat may include triazole, triazine, benzotriazole, nitrobenzotriazole, methylbenzotriazole, naphthol, quinoline, hydroxyquinoline, quinolisine, morpholine, and cyclohexilamine. By dissolving these materials in a solvent such as alcohol or ether to be applied to the film substrate, it is possible to form a layer which sublimates by heat.

Further, the material for the base material which can make adhesion force smaller by the treatment step by cooling may be exemplified by natural rubber, cis-isoprene rubber, styrene/isoprene rubber, butadiene rubber, nitrile rubber, chloroprene rubber, chlorosulfonated polyethylene, polysulfide rubber, butyl rubber, ethylene/propylene copolymer, ethylene/propylene/diene terpolymer, urethane rubber, silicone rubber, fluorine rubber and a mixture of these materials. An adhesion-imparting agent such as an alkylphenol/formadehyde resin, a coumarone/indene resin, a xylene/formadehyde resin or polybutene may be added to the materials. Moreover, by using a sheet obtained by applying a mixture of at least one or not less than two of the aforesaid materials to a resin film, the similar effect can be obtained.

As for the material for the base material capable of decreasing adhesion force by the treatment step of irradiating active light rays, for example, a dicing tape (e.g., "ELEP Holder" UE-111AJ, UE-2092J, NBD-5170K, produced by NITTO DENKO CORPORATION and "Adwill" D-624, D-650 and the like, produced by LINTEC CORPORATION, or the like can be used. These are obtained by applying an acrylic adhesive or the like onto a substrate sheet made of polyolefin, for example. Further, a sheet material having formed a layer, which sublimates by active light rays, on the surface of the base material can be used. The material which sublimates by irradiation of active light rays may be exemplified by a resist agent such as poly(2,2,2-trifluoroethyl-α-chloroacrylate), and a material easy to polymerize with active light rays such as polyacetal. As for active light rays, as well as ultraviolet rays, X-rays, gamma-rays, electron rays or the like can be used.

As for the material for the base material capable of decreasing adhesion force by the treatment step of bringing the material in contact with a solvent, a sheet material having formed an adherent layer which dissolves in the solvent on the surface can be used. As for the material for the adherent layer, when, for example, the solvent is water, water-soluble ink (e.g., MS-03C produced by JUJO CHEMICAL CO.,LTD.), a synthetic polymer such as polyvinyl alcohol, polyethylene oxide, polyacrylic amid, polyacrylic amine and polyvinyl pyrrolidone, natural starch such as potatostarch, tapiocastarch and cornstarch, processed starch obtained by oxidizing, imparting alpha-structure to, etherificating or esterificating these natural starch, cellulose derivatives such as carboxymethyl cellulose and methyl cellulose, a protein, gelatin, glue, casein, shellac, gum Arabic, dextrin and the like can be used. When the solvent is an organic solvent, a natural rubber, asphalt, a chloroprene-type resin, a nitrile rubber-type resin, a styrene-type resin, butyl rubber, polysulfide, silicone rubber, binyl acetate, nitro cellulose or the like can be used.

In the steps of separating the base material from the electrolyte membrane in the production methods in accordance with Embodiments 1 and 2 of the present invention, it is also effective to separate the base material while spraying a gas to the bonding part of the base material and the electrolyte membrane. This method causes no damage to the electrolyte membrane at the time of the separation and further allows prevention of separation between the electrolyte membrane and the catalyst layer and between the catalyst layer and the gas diffusion layer.

As a method for forming the electrolyte membrane on the base material in the production methods of Embodiments 1 and 2 of the present invention, when a method is taken in which the electrolyte membrane is formed on the base material for transfer-printing and then the electrolyte membrane is transfer-printed to the base material, it is effective to use as the material for the base material, for example, a porous sheet made of ultra high molecular weight polyethylene such as "SUNMAP" produced by NITTO DENKO CORPORATION, or a gas permeable porous plate made of paper, synthetic paper, cloth, non-woven fabric, leather, cellulose, cellophane, celluloid or the like. In a case where the electrolyte membrane is formed directly on the base material, on the other hand, it is not preferable to use the porous base material because the solvent of the electrolyte solution infiltrates into the porous base material.

It is possible to easily control adhesion force between the base material and the electrolyte membrane by depressurizing and pressurizing with a gas from the face opposite to the face where the electrolyte membrane has been formed by the transfer-printing method on a base material made of the gas permeable porous plate, and by changing pressure to be propagated through micro pores of the porous plate to the electrolyte membrane according to the degree of the depressurization and pressurization. The use of this control method enables separation and removal of the electrolyte membrane, by depressurization in a step in which an increase in adhesion force to the electrolyte membrane is required, and by more modest depressurization or pressurization in a step in which the base material is separated.

It is also effective that upon separation of the base material made of the porous sheet from the electrolyte membrane, a liquid such as water is infiltrated into the base material to change adhesion force to the electrolyte membrane, and then the base material is separated. It is preferable in this case that the base material itself or the surface treatment part of the base material is not invaded by the solvent of the electrolyte solution.

In the production methods of the Embodiments 1 and 2 of the present invention, the base material for transfer-printing is used for carrying the electrolyte membrane with a thin film thickness and transfer-printing this to the base material for the electrolyte membrane. As the substrates therefor used can be, for example, a film of a resin such as polyester, polyfenyl sulfane, polypropylene, polyethylene, polyvinyl chloride, acetate, polystyrene, polycarbonate, polyimide, aramid, polybutylene telephthalate, polyethersulfone, polyether ethylketene, polyetherimide, polysulfone, polyphthalamide, polyamideimide, polyketone or polyalirate, paper, synthetic paper, woven fabric, non-woven fabric, leather, cellulose, cellophane, celluloid, a metallic plate, a metallic foil or the like. The appropriate thickness of the base material for transfer-printing is from 10 to 100 $\mu$m, and for the substrate thereof, one with small critical surface tension, namely one whose adhesion force to the electrolyte membrane is not large is preferably used in order to make separation properties of the electrolyte membrane favorable.

For weakening adhesion force to the electrolyte membrane and facilitating separation of the electrolyte membrane, it is possible to use, for the aforesaid resin film substrate as the base material for transfer-printing, polyethylene wax, paraffin wax, higher fatty acid alcohol, olganopolysiloxan, anion-type surfactant, cation-type surfactant, amphoteric surfactant, nonion-type surfactant, fluorochemical surfactant, metallic soap, organic carboxylic acid and the derivative thereof, a fluorocarbon resin, a silicone-type resin, dimethyl silicone oil, epoxy modified silicone oil, reactive silicone oil, alkyl modified silicone oil, amino modified silicone oil, a reaction compound of a silane coupling agent, an elemental substance of a lubricant such as silicone rubber, silicone compound or silicone wax, or a mixture of two or more of these.

In the production methods of the Embodiments 1 and 2 of the present invention, an electrolyte layer in the electrolyte layer-electrode assembly is constituted of two electrolyte membranes, and even in the case of using a thin electrolyte membrane having such a defect as a pinhole, the electrolyte layer is formed by attaching by pressure and integrating the two membranes. There is thereby an extremely low probability that the respective defect parts of the membranes are overlapped to form a through hole, and a highly-reliable PEFC can thus be obtained.

In this case, it is necessary to form the electrolyte membrane-electrode assembly such that the air does not remain between the membranes. This is of importance for substantially eliminating a channel which brings about crossover of the gases between the cathode and anode so as to produce a reliable PEFC of great power even when the electrolyte membrane with a thin film thickness is used.

When an air layer remains in the bonding part, there is a possibility that a proton-conductive channel is cut off, and three parts, the defect part of the first electrolyte membrane, the air layer and the defect part of the second electrolyte membrane, form a channel through which the fuel gas and the air can path, leading to occurrence of the crossover.

In order to avoid remanence of the air layer in the bonding part, it is not necessarily required to completely prevent the air from being caught in the bonding part upon attachment by pressure, but, after bonding of the two membranes, the air remaining in the bonding part may be removed in a vacuum chamber. In this case, it is preferable that the electrolyte layer-electrode assembly is put into the vacuum chamber and then gradual and stepped depressurization is conducted so as to prevent a partial explosion of the assembly caused by rapid expansion of the remaining air. It is also effective for prevention of the partial explosion that the assembly is stood still, while being warmed, in an autoclave at several atmospheric pressure before being put into the vacuum chamber.

For preventing the air from getting caught between the membranes upon attachment by pressure, it is also effective to employ a method in which a solvent such as water or alcohol is sprayed to the bonded face in a small amount with an atomizer, followed by attachment by pressure.

It is further effective that the two electrolyte membranes are piled and then attached by pressure in vacuo in the vacuum chamber or in a depressurized atmosphere. The attachment by pressure may also be conducted in an atmosphere of a gas such as hydrogen which passes through the membrane with ease for the purpose of facilitating escape of the caught air bubbles out of the bonding part. Moreover, as a method applicable to the production method of Embodiment 2 of the present invention, a preferable method is that two base materials, each having the catalyst layer and the electrolyte membrane on one face thereon, are piled with the respective faces with the electrolyte membrane thereof mutually opposed, and then attached by pressure little by little with rolls from the end like a cleat. A method in which a heat roller is used for the attachment by pressure is also effective.

For production of the reliable polymer electrolyte fuel cell of great power by the production methods of Embodiments 1 and 2 of the present invention, it is effective that the electrolyte membrane is a thin membrane having a film thickness of 3 to 10 $\mu$m.

In the production methods of Embodiments 1 and 2 of the present invention, it is preferable that a frame-shaped reinforcing film made of a hydrogen ion-conductive film or a gas diffusive film is interposed between the electrolyte layer and the catalyst layer, between the catalyst layer and the gas diffusion layer or between the two electrolyte membranes forming the electrolyte layer, such that the reinforcing film covers the electrolyte layer in the clearance between the gasket and the gas diffusion electrode.

Thereby, the clearance between the gasket and the gas diffusion electrode where stress tends to be concentrated most is covered with the reinforcing film, and thus the electrolyte membrane present at the clearance between the gasket and the gas diffusion electrode and in the vicinity thereof are protected, enabling prevention of the electrolyte membrane in this part from being torn or a flaw or of pinhole from being generated. Further prevented in operation of the fuel cell can be the pressure difference between the fuel gas and the air generated between the gasket and the gas diffusion electrode, generation of the pinhole or torn-membrane due to pressure accompanied by sliding of the membrane caused by changes in moisture, damage to the electrolyte layer such as partial cut-off with the edge of the gas diffusion electrode, or the like.

In a case where a hydrogen ion-conductive film is used as the reinforcing film and this film is interposed between the electrolyte layer and the catalyst layer or between the catalyst layer and the gas diffusion layer, an adhesion property between the catalyst layer and the conductive film becomes favorable. This is due to containment of a homogenous proton-conductive resin with a hydrogen ion-conductive film in the catalyst layer. Although the part of the hydrogen-ion conductive film to be inserted under the gasket is interposed between the gasket and the electrolyte layer, it should not work against the sealing property of the fuel cell because of a favorable adhesion property between the hydrogen ion-conductive film and the gasket. Also in a case where this film is arranged between the electrolyte membranes or between the electrolyte layer and the catalyst layer, the arrangement of the film does not cause a decrease in reaction area of the gas diffusion electrode because the film has proton conductivity. As for the hydrogen ion-conductive film, a perfluorocarbon sulfonic acid-type electrolyte membrane is particularly preferable as having high intensity. For a film corresponding to this film, for example, Nafion 112 produced by Du Pont in the US, Flemion produced by Asahi Glass Co., Ltd., GORE-SELECT produced by JAPAN GORETEX INC., Aciplex produced by ASAHI KASEI CORPORATION or the like can be employed.

Further, when the gas diffusive film is used as the reinforcing film, there is the effect of preventing damage to the electrolyte membrane in the production process or operation of the fuel cell, as in the case of using the hydrogen ion-conductive film. In addition, when the gas diffusive film is arranged anywhere between electrolyte membranes, between the electrolyte layer and the catalyst layer, and between the catalyst layer and the gas diffusion layer, there is no decrease in opening ratio of the gas diffusion electrode since proton conductivity in the part covered with the gas diffusive film is not impaired.

As for the gas diffusive film, a film with high gas permeability and a thin film thickness and further with sufficient strength is preferably used, and to a reliable material satisfying these conditions, a film made of a fluoropolymer is applied, which may be specifically exemplified by a porous film made of a tetrafluoro-ethylene resin (e.g., MICRO-Tex produced by NITTO DENKO CORPORATION), or the like.

Furthermore, in the production methods of Embodiments 1 and 2 of the present invention, it is preferable that a frame-shaped thick film section is formed in the electrolyte membrane, and the thick film section is provided so as to cover the clearance between the gasket and the gas diffusion electrode.

The thick film section has the function and effect of preventing damage to the electrolyte membrane in the production process or operation of the PEFC, as with the aforesaid reinforcing film. Because the thick film section is formed of the electrolyte, proton conductivity of the PEFC is very unlikely to be impaired. As for the method for forming the frame-shaped thick film section on the electrolyte membrane, a method in which an electrolyte solution is screen-printed in the shape of frame on an electrolyte membrane formed to have a uniform thickness, a method in which the electrolyte solution is spray-applied in the shape of flame with the use of a metal mask, or the like, is effective.

(2) Second Production Method:

The present invention secondly relates to a production method of an electrolyte membrane-electrode assembly for a polymer electrolyte fuel cell, the electrolyte membrane-electrode assembly having: a hydrogen ion-conductive polymer electrolyte membrane; and a gas diffusion electrode which contains a catalyst layer and a gas diffusion layer and is bonded to both faces of the hydrogen ion-conductive polymer electrolyte membrane, the method being characterized by comprising: a step of bonding a hydrogen ion-conductive polymer electrolyte membrane and a catalyst layer via a coating layer; a step of removing the coating layer; and a step of obtaining an electrolyte membrane-electrode assembly by forming a gas diffusion layer on the catalyst layer.

As opposed to the conventional production method of the electrolyte membrane-electrode assembly for the fuel cell, when the polymer electrolyte membrane is formed directly on the catalyst layer, no pressure should be applied in the process, leading to formation of a thin membrane without breakage thereof; however, direct application of a polymer electrolyte raw material solution to the catalyst layer results in infiltration of the solution into the porous catalyst layer, and it has thereby been difficult to obtain a favorable film.

In the present invention, especially for the purpose of enabling formation of a polymer electrolyte membrane having a thin film thickness, a thin polymer electrolyte membrane is first formed on a specific medium (e.g., a coating layer), followed by removal of the medium, to eventually obtain a polymer electrolyte membrane-catalyst layer interface. Here, the medium should thus have a relatively smooth surface, not be porous and be capable of forming a thin polymer electrolyte membrane.

That is to say, the present invention provides a production method of an electrolyte membrane-electrode assembly for a polymer electrolyte fuel cell, obtained by bonding the catalyst layer and the gas diffusion electrode to the both faces of the hydrogen ion-conductive polymer electrolyte membrane, the method being characterized by comprising: a step (1) of arranging a medium on the catalyst layer; a step (2) of forming a polymer electrolyte membrane on the medium; and a step (3) of forming the assembly by removing the medium.

However, either the step (1) or the step (2) is conducted first. In the following, preferable embodiments of the second production method of the present invention will be described in the separate cases of first conducting the step (1) and of first conducting the step (2).

(iii) Embodiment 3

A production method of an electrolyte membrane-electrode assembly for a fuel cell in accordance with Embodiment 3 of the present invention is a method for first forming a coating layer as a medium on the catalyst layer, the method comprising: a step (a1) of forming a coating layer on a catalyst layer; a step (b1) of applying a hydrogen ion-conductive polymer electrolyte solution onto the face opposed to the face of the coating layer in contact with the catalyst layer; a step (c1) of removing the coating layer to obtain an electrolyte membrane-catalyst layer assembly; and a step (d1) of forming a gas diffusion layer on the catalyst layer.

There is a need for eventual removal of the coating layer; in the step (a1), it is effective that the coating layer is formed of a material which sublimates at 200° C. or lower, a material which pyrolytically decomposes at 200° C. or lower, a material which decomposes with ultraviolet rays and sublimates, a material which decomposes with ultraviolet rays and dissolves in a solvent, a water-soluble material, or a material which dissolves in an organic solvent. 200° C. or lower is mentioned here because perfluorocarbon sulfonic acid ionomer as the polyer electrolyte does not pyrolytically decompose at 200° C. or lower.

The examples of the material which sublimates at 200° C. or lower may include triazole, tiazine, benzotriazole, nitrobenzotriazole, methylbenzotriazole, naphthol, quinoline, hydroxyquinoline, quinolizine, morpholine and cyclohexylamine. The layer can be formed by making a paste of these materials with a solvent such as alcohol or ether, to be applied.

The examples of the material which pyrolytically decomposes at 200° C. or lower may include polyoxymethylene, poly-α-methylene sulfone, polypropylene oxide, polyisoprene, polymethyl methacrylate and polymethyl acrylate.

The examples of the material which decomposes with ultraviolet rays and sublimates may include a resist agent such as poly(2,2,2-trifluoroethyl-α-chloroacrylate) and a material prone to depolymerize with ultraviolet rays such as polyacetal.

The examples of the material which decomposes with ultraviolet rays and dissolves in the solvent may include a photosensitive resin such as poly(methylisopropenillic ketone).

The water-soluble material may be exemplified by synthetic polymers such as polyvinyl alcohol, polyethylene oxide, polyacrylic amid, polyacrylic amine and polyvinyl pyrrolidone, natural starch such as potatostarch, tapiocastarch and cornstarch, processed starch obtained by oxidizing, imparting alpha-structure to, etherificating or esterificating these natural starch, cellulose derivatives such as carboxymethyl cellulose and methyl cellulose, a protein, gelatin, glue, casein, shellac, gum Arabic and dextrin.

The material which dissolves in the organic solvent may be exemplified by a natural rubber, asphalt, a chloroprene-type resin, a nitrile rubber-type resin, a styrene-type resin, butyl rubber, polysulfide, silicone rubber, binyl acetate and nitro cellulose.

Next, from the viewpoint that a thin and uniform coating layer can be formed, it is effective that screen printing, a roll coater or a spray application method is used for the formation.

It is possible for the skilled person to select as appropriate the method for forming the coating layer and the subsequent drying method, according to a material for the coating layer, a condition for the formation, and the like.

Also, for the material for formation of the coating layer, the concentration thereof and the temperature for the formation may be selected within the range that the membrane can be formed.

Subsequently, in Embodiment 3, the polymer electrolyte membrane is formed on the coating layer formed as thus described, as the step (b1).

Differently from the conventional case where the polymer electrolyte membrane supplied by the rolls is used, it is possible, according to this method, to form the polymer electrolyte membrane thinner than the conventional one, as thus described.

As for the material for formation of the polymer electrolyte membrane, the same polymer electrolyte solution as the conventional one may be used, and the concentration thereof and the temperature for the formation can be selected as appropriate. Moreover, this polymer electrolyte layer is effectively formed by the screen printing, the roll coater or the spray application method, as with the coating layer.

In the step (c1), the coating layer is removed. The way of the removal can be selected according to a type and characteristic of a material forming the coating layer, and a method such as heating, ultraviolet irradiation, dissolution in water or a solvent can be employed. Although it is necessary that the method applied here be carried out under a condition that the performance of the assembly to be obtained is not impaired, the skilled person can select such a condition as appropriate.

Finally, in the step (d1), the gas diffusion layer is formed on the catalyst layer by following the conventional method to obtain the electrolyte membrane-electrode assembly of the present invention. At this time, a cell member such as a gasket may be arranged.

(iv) Embodiment 4

Next, a production method in accordance with Embodiment 4 of the present invention, which relates to the case of forming the polymer electrolyte membrane on the medium first, is a production method of an electrolyte membrane-electrode assembly obtained by bonding a catalyst layer and a gas diffusion layer on both faces of an ion-conductive polymer electrolyte membrane, the method being characterized by comprising: a step (a2) of forming a hydrogen ion-conductive polymer electrolyte membrane on a polymer film; a step (b2) of arranging a catalyst layer on the face opposed to the face of the polymer film having the hydrogen ion-conductive polymer electrolyte membrane; a step (c2) of removing the polymer film to obtain an electrolyte membrane-catalyst layer assembly; and a step (d2) of forming a gas diffusion layer on the catalyst layer.

Herein, a polymer film as the medium is formed in advance. For this polymer film, the material may be the same as that for the coating layer in Embodiment 3 above. Namely, the polymer film can be formed of a material which sublimates at 200° C. or lower, a material which pyrolytically decomposes at 200° C. or lower, a material which decomposes with ultraviolet rays and sublimates, a material which decomposes with ultraviolet rays and dissolves in a solvent, a water-soluble material, or a material which dissolves in an organic solvent.

Since the polymer film is formed separately from the gas diffusion layer, however, it may be formed by, for example, dropping or applying the material onto a glass plate, a petri dish or a film, followed by drying.

The polymer electrolyte membrane is then formed on the polymer film. Also in this case, the same materials as in Embodiment 3 above can be used for the formation by screen printing, the roll coater or the spray application method.

Subsequently, the polymer film with the polymer electrolyte membrane formed on one face thereof is disposed on the catalyst layer of the gas diffusion electrode by contacting the other face of the polymer film without the polymer electrolyte membrane to the catalyst layer, and finally the polymer film is removed in the same manner as in the case of removing the coating layer in Embodiment 3 above so that the assembly in accordance with the present invention can be obtained. There is no particular limitation to the method for disposal of the polymer film on the gas diffusion electrode, and it may be mechanically disposed, for example.

(v) Embodiment 5

Furthermore, the present invention relates to a production method of an electrolyte membrane-electrode assembly obtained by bonding a catalyst layer and a gas diffusion electrode to both faces of an ion-conductive polymer electrolyte membrane, the method being characterized by comprising: a step (a3) of forming a coating layer composed of a hydrogen ion-conductive polymer electrolyte on a catalyst layer; a step (b3) of applying a hydrogen ion-conductive polymer electrolyte solution onto the face opposite to the face of the coating layer in contact with the catalyst layer; a step (c3) of removing the coating layer to obtain an electrolyte membrane-catalyst layer assembly; and a step (d3) of forming a gas diffusion layer on the catalyst layer.

In Embodiment 5, the material for the coating layer is the same as that for the polymer electrolyte membrane. As thus described, the medium is required for preventing infiltration of the polymer electrolyte solution into the catalyst layer; in this embodiment, the gelation phenomenon of the polymer electrolyte is utilized and the gelated layer is used as a layer for preventing the infiltration into the catalyst layer.

That is to say, first, a small amount of a polymer electrolyte membrane raw material solution is sprayed with a spray to the catalyst layer to evaporate the solvent. Because the polymer electrolyte solution is gelated when a solvent such as ethyl alcohol is used and the concentration of the polymer electrolyte becomes from 10 to 20%, a jelly-like or half-solid gelated layer is formed simultaneously with evaporation of the solvent.

Since appropriate selections of a distance between the spray and the catalyst layer, a spraying condition, and a spraying amount enable control on the evaporation state of the solvent of the polymer electrolyte solution upon arrival thereof at the surface of the catalyst layer, it is possible to limit infiltration of the solution into the catalyst layer to just the surface part thereof. Repetition of this operation several times allows the polymer electrolyte solution to form the thin, gelated layer so as to totally cover the surface of the catalyst layer. Thereafter, this catalyst layer is dried at 100 to 140° C. for a short time to form a coating layer which no longer dissolves in a solvent such as ethyl alcohol. Next, when the raw material solution of the polymer electrolyte membrane is applied onto the coating layer, the coating layer becomes a layer for interrupting the raw material solution to the catalyst layer, resulting in favorable formation of the polymer electrolyte membrane. Because the material for the coating layer is the same as that for the polymer electrolyte membrane, the coating layer can exert proton conductivity as a part of the polymer electrolyte membrane after formation of the polymer electrolyte membrane.

It should be noted that in the method thus described, although the polymer electrolyte membrane in the state that one face thereof is in contact with the gas diffusion layer is formed, with the thin polymer electrolyte membrane having been formed, the catalyst layer and the carbon paper can be bonded to the other face of the polymer electrolyte membrane to obtain the electrolyte membrane-electrode assembly for the fuel cell.

(vi) About the Catalyst Layer

The present inventors have found that an excellent electrolyte membrane-electrode assembly for a fuel cell can be produced by forming a catalyst layer with a mixture containing a catalyst body composed of a noble metal catalyst and a carbon powder, a polymer electrolyte, and a polyfunctional basic compound.

Accordingly, the present invention provides an electrolyte membrane-electrode assembly for a polymer electrolyte fuel cell, comprising a polymer electrolyte membrane and a pair of electrodes arranged on both sides of the polymer electrolyte membrane, and being characterized in that at least one of the electrodes is constituted of a gas diffusion layer and a catalyst layer composed of: a mixture containing a catalyst body composed of a noble catalyst and a carbon powder, a polymer electrolyte, and a polyfunctional basic compound.

In this assembly, it is effective that the polyfunctional basic compound is polyfunctional amine.

It is also effective that the catalyst layer contains from 0.1 to 10 wt % of polyfunctional basic compound with respect to the polymer electrolyte.

The present invention further provides an electrolyte membrane-electrode assembly for a polymer electrolyte fuel cell, comprising a polymer electrolyte membrane and a pair of electrodes arranged on both sides of the polymer electrolyte membrane, and being characterized in that at least one of the electrodes is constituted of a gas diffusion layer and a catalyst layer composed of: a catalyst body composed of a noble catalyst and a carbon powder having a basic surface functional group; and a polymer electrolyte.

Also in this assembly, it is effective that the basic surface functional group is amine.

The present invention further provides an electrolyte membrane-electrode assembly for a polymer electrolyte fuel cell, comprising a polymer electrolyte membrane and a pair of electrodes arranged on both sides of the polymer electrolyte membrane, and being characterized in that the polymer electrolyte membrane includes a polyfunctional basic compound, and the assembly comprises the polymer electrolyte membrane and a gas diffusion electrode.

Also in this case, it is effective that the polyfunctional basic compound is polyfunctional amine. Further, it is effective that the polymer electrolyte membrane contains a polyfunctional basic compound at 1 to 10 wt % of the polymer electrolyte. It is also effective that the main chain part of the polyfunctional basic compound is perfluoronated.

The assembly for the polymer electrolyte fuel cell composed of the polymer electrolyte membrane and the gas diffusion electrode in accordance with the present invention includes a polyfunctional basic compound or a carbon powder having a basic surface functional group.

This polyfunctional basic compound can be contained in the polymer electrolyte membrane and/or the catalyst layer constituting the assembly and is bonded to a part of the sulfonic acid group of ionomer as the polymer electrolyte to form a three-dimensional network so that the ionomer becomes resistant to flowing into the gas diffusion layer with drained water.

The carbon powder having the basic surface functional group can be contained in the catalyst layer constituting the electrolyte membrane-electrode assembly and is bonded to a part of the sulfonic acid of ionomer as the polymer electrolyte to prevent the ionomer from melting into drained water and flowing out. Thereby, the gas diffusion layer maintains gas permeability, and the catalyst layer and the polymer electrolyte membrane exert the function of being resistant to impairing proton conductivity.

An electrolyte membrane-electrode assembly composed of a polymer electrolyte and a pair of electrodes arranged on both sides of the polymer electrolyte membrane will be described:

When the polyfunctional basic compound is contained in the catalyst layer, the electrolyte membrane-electrode assembly for the polymer electrolyte fuel cell of the present invention is composed of a polymer electrolyte membrane and a pair of electrodes arranged on both faces of the polymer electrolyte membrane, and at least one of the electrodes is constituted of: a catalyst layer composed of a mixture containing a catalyst body composed of a noble metal catalyst and a carbon powder, a polymer electrolyte, and a polyfunctional basic compound; and a gas diffusion layer made of carbon paper, carbon cloth or the like.

Figure 12:
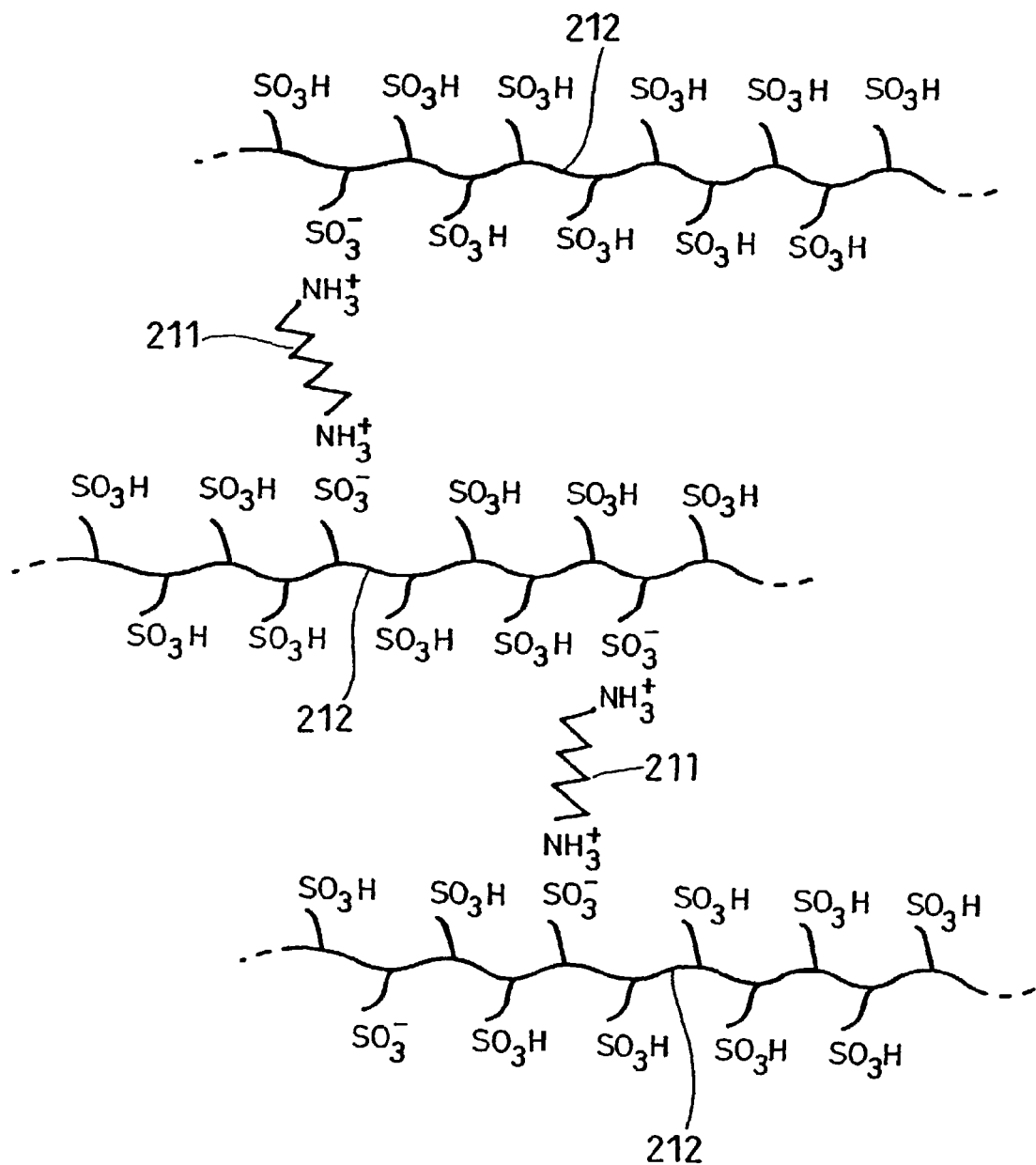
FIG. 12 is a diagram conceptually representing the interaction of ionomer and bifunctional amine in the catalyst layer of the electrolyte membrane-electrode assembly in Reference Example 1 of the present invention.

As FIG. 12 shows, this polyfunctional basic compound 211 is bonded to a part of the sulfonic group of ionomer 212 to form a three dimensional network, exerting the effect of inhibiting flowing out of the ionomer.

As for the polyfunctional basic compound, one having, in one molecule, two or more of functional groups capable of reacting with the sulfonic group may be employed. The examples may include difunctional amine such as ethylene diamine, 1,2-propylene diamine, tetramethylene diamine, hexamethylene diamine, heptamethylene diamine, octamethylene diamine and nonamethylene diamine, trifunctional amine such as diethylene triamine, aromatic polyfunctional amine such as benzene diamine, 1,2,3-triamino benzene and 1,2,3,4-tetraamino benzene, compounds having amidino groups such as 1,5-diazabicyclo[4.3.0]nona-5-ene and 1,8-diazabicyclo[5.4.0]undeca-7-ene, polysaccharide including N such as streptomycin, vitamins such as vitamin B2 and vitamin B12, azanaphtalenes such as xanthan pterin, leuco pterin and methotrexate, alkaloids such as kinin, strychnine and brucine, polypeptide such as glycyl alanine, alanyl glycine, aspartame and glutathione, pyridazine, pyrimidine, triazines, tetrazines, cinnoline, quinazoline, phtalazine, quinozaline, pteridine, lysergic acid diethylamide, adenine, benzoimidazole, purine, hydrazide, nicotine, tetrahydrofolic acid, hexamethylenetetramine, and 4,4'-diaminobiphenyl.

Among them, polyfunctional amine is preferable from the viewpoint of occurrence of a chemical reaction of an acid with a base in a relatively mild condition.

It is also preferable that hydrogen in the skeleton part of the polyfunctional basic compound is perfluoronated. This is because, with hydrogen perfluoronated, decomposition attributed to a reaction of drawing out hydrogen atoms, or the like, can be prevented, and high reliability can thus be realized.

The perfluoronated polyfunctional amine may be exemplified by tetrafluoro-p-phenylenediamine, 4,4'-diamonooctafluorobiphenyl, and 2,4,6-tris(perfluorohepthyl)-1,3,5-triazine.

It is preferable that the polyfunctional basic compound in the catalyst layer is from 0.1 to 10 wt % with respect to the polymer electrolyte. This is because, when a replacement ratio is about several % of the total number of the acidic groups such as the sulfonic group, there is a small influence on proton conductivity.

Next, in a case where the catalyst layer contains the carbon powder having the basic surface functional group, an electrolyte membrane-electrode assembly for a polymer electrolyte fuel cell in accordance with the present invention comprises a polymer electrolyte membrane and a pair of electrodes arranged on both sides of the polymer electrolyte membrane, and at least one of the electrodes is constituted of a gas diffusion layer and a catalyst layer composed of: a catalyst body composed of a noble metal catalyst and a carbon powder having a basic surface functional group; and a polymer electrolyte.

Figure 13:
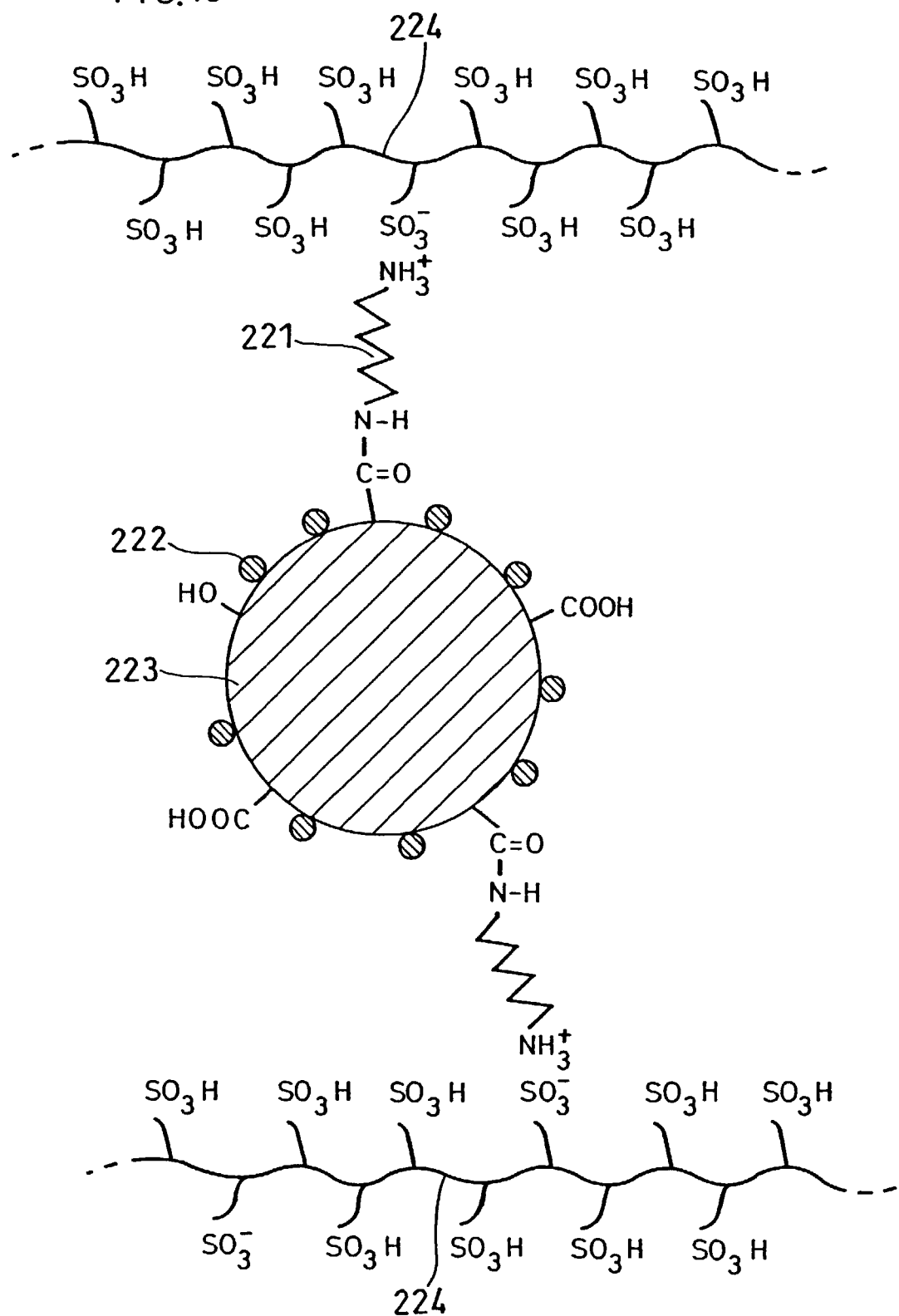
FIG. 13 is a diagram conceptionally representing the interaction of ionomer and the basic functional group on the carbon fine powder in the catalyst layer of the electrolyte membrane-electrode assembly in Reference Example 2 of the present invention.

As FIG. 13 shows, the basic surface functional group 221 of the carbon powder 223 in the catalyst layer is bonded to a part of the sulfonic acid group of ionomer 224, exerting the effect of suppressing flowing out of the ionomer. The basic surface functional group 221 on the carbon powder 223 is replaced by, for example, a carboxyl group present on the surface of the carbon powder, or the like, before mixture with the ionomer. As for the basic surface functional group, amines are preferable from the viewpoint of occurrence of a chemical reaction of an acid with a base in a relatively mild condition.

The number of the basic surface functional groups on the carbon powder may be one. In a case where the basic material is a monomolecule, the basic material flows away with the ionomer since there is no crosslinking effect without two or more of the functional groups. In a case where the substrate of the basic material is the carbon powder, on the other hand, since the carbon powder is fixed in the catalyst layer, the basic functional group will not flow away with the ionomer even when the number thereof is one. In view of the aforesaid functions, there is no need for presence of the basic functional group on the surface of all the carbon powders. There is also no need for bonding of all the ionomer to the surface functional group. These are because bonding to a part of the ionomer allows sufficient suppression of the flowing out due to an anchor effect.

Further, when the polyfunctional basic compound is included in the polymer electrolyte membrane, an electrolyte membrane-electrode assembly for a polymer electrolyte fuel cell in accordance with the present invention is an assembly composed of a polymer electrolyte membrane and electrodes arranged on both faces of this membrane, and the polymer electrolyte membrane includes the polyfunctional basic compound.

As thus described, it is also preferable here that the polyfunctional basic compound is polyfunctional amine and that the weight of the polyfunctional basic compound with respect to the polymer electrolyte is from 1 to 10 wt %. This is because a low replacement ratio of the acidic group such as the sulfonic acid results in a small influence on proton conductivity.

Below, the present invention will be described more specifically by the use of examples; however the present invention is not limited to these:

EXAMPLE 1

An electrolyte membrane-electrode assembly was produced by the steps above described by means of FIGS. 1 to 3, and then a PEFC was fabricated using this assembly.

First, by the steps FIGS. 1(*a*) to (*e*), an electrolyte membrane 2 was formed on a base material 3 by a transfer-printing method, and a catalyst layer 6 was formed thereon by the transfer-printing method.

An electrolyte solution was prepared by adding ethyl alcohol to an alcohol solution (Brand name: Flemion FSS-1 solution, produced by Asahi Glass Co., Ltd.) containing 9 wt % of an electrolyte, for preventing gelation, to be diluted to be an 8 wt % solution. A polypropylene film (Brand name: Torayfan, produced by Toray Industries, Inc.) with a film thickness of 50 $\mu$m was used for a base material 1 for transfer-printing. An application film of the electrolyte solution was heated and dried with an infrared ray heater to produce an electrolyte membrane 2 with a film thickness of 6 $\mu$m. An ultraviolet separation tape (D-624, produced by LINTEC CORPORATION) was used for the base material 3 for the electrolyte membrane.

A polypropylene film (Brand name: Torayfan, produced by Toray Industries, Inc.) with a film thickness of 50 $\mu$m was used for a base material 5 for a catalyst, on which a catalyst layer 6 was formed in the following manner: First, 40 g of product obtained by making conductive carbon particle (Brand name: ketjen black EC, produced by Ketjenblack International Corporation) with a specific surface area of 800 $m^2$/g, carrying a platinum particle with a mean particle size of about 30 angstrom thereon in the weight ratio of 1:1, was put into a glass container. 120 Gram of water was added into this glass container while being stirred with a ultrasonic sound stirrer, and then 210 g of Flemion FSS-1 solution was added thereinto while being stirred, to prepare a catalyst paste. This paste was stirred with the ultrasonic sound stirrer for one hour, and then developed on the base material 5 for the catalyst using a barcoater, followed by drying at room temperature, to form a catalyst layer 6. In the step of attaching by pressure the catalyst layer 6 to the electrolyte membrane 2, the temperature was raised to 100° C. while they were pressurized at 4 kgf/$cm^2$, and then they were hot pressed at 40 kgf/$cm^2$.

Next, a semi-assembly of the electrolyte memebrane-electrode was constituted by the steps FIGS. 2(*a*) to (*d*). In the step of ultraviolet irradiation, ultraviolet rays of 365 nm and 2000 mJ/$cm^2$ were irradiated. Carbon paper with a size of 100 mm×200 mm, repellent treated by being soaked in a solution obtained by diluting with water an aqueous dispersion (D1, produced by DAIKIN INDUSTRIES, LTD.) containing 50 wt % of fluorocarbon resin, to make the concentration a half, was used as a gas diffusion layer 10; a hydrogen ion-conductive film reinforced with a fluorocarbon polymer cloth was used as a hydrogen ion-conductive film 11.

Subsequently, an electrolyte membrane-electrode assembly was constituted by the steps FIGS. 3(*a*) to (*c*). In each of the steps of hot pressing in FIG. 2 and FIG. 3, after the temperature was raised to 130° C. simultaneously with pressurization at 5 kgf/cm$^2$, the hot pressing was conducted at 50 kgf/cm$^2$ for 10 minutes.

After the hot pressing in FIG. 3, for the purpose of removing the air out of the spaces between the electrolyte membranes of the attached by pressure electrolyte membrane-electrode assembly, the electrolyte membrane-electrode assembly was put into a depressurized container, in which there was conducted slow depressurization from atmospheric pressure to 0.1 atm in ten minutes. Thereafter conducted was further depressurization down to 0.01 atm in 10 minutes and, then, to 0.001 atm, and the assembly was stood still for 30 minutes. This electrolyte membrane-electrode assembly was then taken out of the depressurized container for observation and it was confirmed, as a result, that the air having been caught between the electrolyte membranes was removed in the depressurized container and air bubbles disappeared.

Next, a PEFC was fabricated using this electrolyte membrane-electrode assembly to evaluate the actuation characteristic thereof. First, respective manifold apertures for circulation of the fuel gas and the oxidant gas were formed in a gasket 9 in the electrolyte membrane-electrode assembly. A separator with an oxidant gas flow channel formed was placed on one face of the electrolyte membrane-electrode assembly, and a separator with a fuel gas flow channel formed was placed on the other face of the assembly, to obtain a unit cell. Two of the unit cells were stacked, the stack of the two unit cells was interposed between separators with a cooling medium flow channel formed, and by repetition of this pattern, a fuel cell stack including 100 unit cells was fabricated. Each of the separators was made to have a thickness of 1.3 mm, and the oxidant gas flow channel, the fuel gas flow channel or the cooling medium flow channel was made to have a depth of 0.5 mm. A current correcting plate, an insulating plate and an end plate were disposed at each of both ends of the fuel cell stack, which were fixed with a fastening rod to fabricate a PEFC. The fastening pressure at this time was made 10 kgf/cm$^2$.

The PEFC as thus fabricated was subjected to a successive power generation test in such conditions as a fuel utilization ratio of 85%, an oxygen utilization ratio of 60%, a current density of 0.7 A/cm$^2$ to obtain a discharge voltage of 0.7 V per a unit cell. Therefrom, high output of 0.49 W/cm$^2$ was obtained. In this test, the concentration of carbon monoxide of a gas obtained by steam-reforming methane was decreased to be 50 ppm or lower and the gas was humidified and heated to have a dew point of 70° C., and then supplied to the fuel cell electrode (anode) side as a fuel gas, while the air humidified and heated to have a dew point of 45° C. was supplied to the air electrode (cathode) side as an oxidant gas. The temperature of the PEFC was kept at 75° C. by using cooling water as the cooling medium.

EXAMPLE 2

The same electrolyte solution as that in Example 1 was applied onto the same base material for the electrolyte membrane as that in Example 1 with the use of a coater, which was heated and dried with an infrared ray heater to form the electrolyte membrane 2 with a film thickness of 6 μm directly on the base material. Except the above, an electrolyte membrane-electrode assembly and a PEFC were produced in the same manner as in Example 1, to be evaluated.

As a result of the depressurization test on the electrolyte membrane-electrode assembly, it was confirmed that the air having been caught between the electrolyte membranes was removed in the depressurized container and air bubbles disappeared. Further, in the successive power generation test on the PEFC using this electrolyte membrane-electrode assembly, a high discharge voltage of about 0.7 V per a unit cell was obtained, as in Example 1.

COMPARATIVE EXAMPLE 1

Except that a fluorine polymer film (Nephron tape, produced by NICHIAS Corporation) with a thickness of 50 μm as a material for the reinforcing film was used in place of the hydrogen ion-conductive film in Example 1, an electrolyte membrane-electrode assembly and a PEFC were produced and evaluated in exactly the same manner as in Example 1. As a result of the depressurization test, it was confirmed that the bonding part of the reinforcing film of the assembly taken out of the depressurized container had become easy to be pealed off. In the successive power generation test on the PEFC using this electrolyte membrane-electrode assembly, although a discharge voltage of about 0.7 V per a unit cell was obtained as in Example 1, the effective reaction area of the electrode decreases by about 2%, thus lowering output accordingly.

EXAMPLE 3

Figure 7:
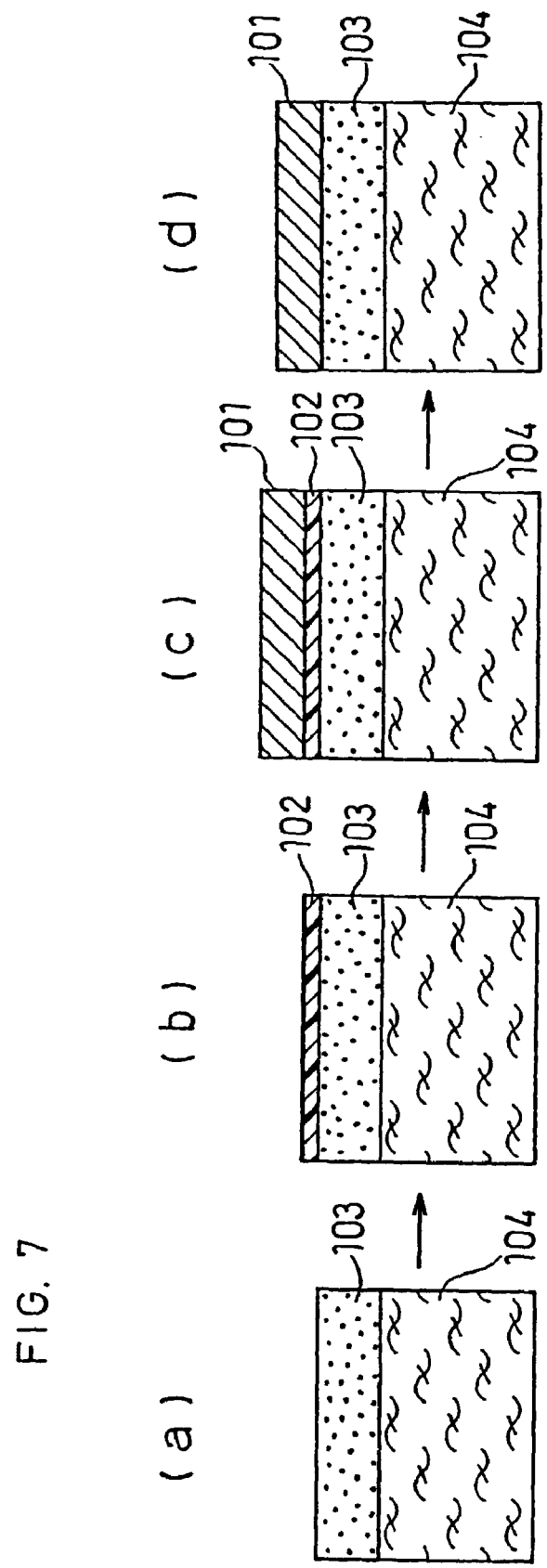
FIG. 7 is a vertical sectional view representing the production process of the electrolyte membrane-electrode assembly for a fuel cell in Example 3.

FIG. 7 schematically shows a production process of the electrolyte membrane-electrode assembly in accordance with the present example.

First, for obtaining a catalyst layer 103, a carbon powder carrying from 10 to 30 wt % of a platinum catalyst thereon was mixed with N-butyl acetate such that the weight ratio of above platinum and N-butyl acetate was 1:120, to obtain a dispersion of the platinum catalyst. While the dispersion was stirred with a magnetic stirrer, an ethyl alcohol solution of the polymer electrolyte was added dropwise until the amount ratio of the platinum and the polymer electrolyte became 1:2, which was then made to give a paste with the use of an ultrasonic dispersion machine. As for the ethyl alcohol solution of the polymer electrolyte, the Flemion FSS-1 solution produced by Asahi Glass Co., Ltd. was used.

This catalyst paste was applied onto one face of carbon paper as a base material 104 produced by Toray Industries, Inc. with a size of 100 mm×200 mm, on which from 20 to 60 wt % of a tetrafluoroethylene-hexafluoropropylene copolymer was welded in advance, and then dried at 50 to 60° C. to obtain a gas diffusion electrode. A catalyst layer 103 as thus formed had a thickness of 30 to 40 μm.

Next, an aqueous solution of hydroxypropyl methylcellulose (60SH4000 produced by Shin-Etsu Chemical Co., Ltd.) with a concentration of 3% of and viscosity of 4000 CPS was applied by the roll coater method, followed by drying, to form a coating layer 102.

Subsequently, the Flemion FSS-1 solution with the viscosity thereof adjusted, as the polymer electrolyte solution, was applied to the catalyst layer side of the gas diffusion layer with the coating layer formed, and then ethyl alcohol as the solvent was removed with a dryer, to obtain a gas diffusion electrode as in FIG. 7(*c*).

It was then baked with the dryer in the condition of 200° C. for 30 minutes. This baking step allowed elimination of the coating layer 102 having been formed on the catalyst layer 103, resulting in obtainment of a gas diffusion electrode where the polymer electrolyte membrane 101 was in contact with the surface of the catalyst layer 103, as shown in FIG. 7(d). The polymer electrolyte membrane 101 at this time had a thickness of 5 to 20 μm, and hence a polymer electrolyte membrane layer with a uniform film thickness which was not immersed into the catalyst layer was obtained.

The gas diffusion electrode with the polymer electrolyte layer having a thickness of 12 μm as thus produced and the gas diffusion electrode with only the catalyst layer formed were laminated such that the respective catalyst layers thereof were inwardly opposed to each other, the temperature was raised to 150° C. simultaneously with pressurization at 5 kgf/cm² with the use of a hot pressing machine and, after the temperature was raised to 150° C., hot pressing was conducted at 50 kgf/cm² for 10 minutes.

Using this assembly, a voltage was measured at 0.7 A/cm² when a cell temperature was 75° C., a negative electrode bubbler temperature was 70° C., a positive electrode bubbler temperature was 65° C., a hydrogen utilization ratio was 70% and an air utilization ratio was 40%, to be 0.70 V. Namely, the output power was 0.49 W/cm², and such high output power could be obtained.

It should be noted that, although the example of using carbon paper as the base material 104 was described in the present example, the base material 104 is not necessarily required to be carbon paper, but it may be a sheet of a polymer such as polypropylene (PP) or polyethylene terephthalate (PET). When the base material 104 is such a sheet, carbon paper may be bonded after separation.

COMPARATIVE EXAMPLE 2

Figure 10:
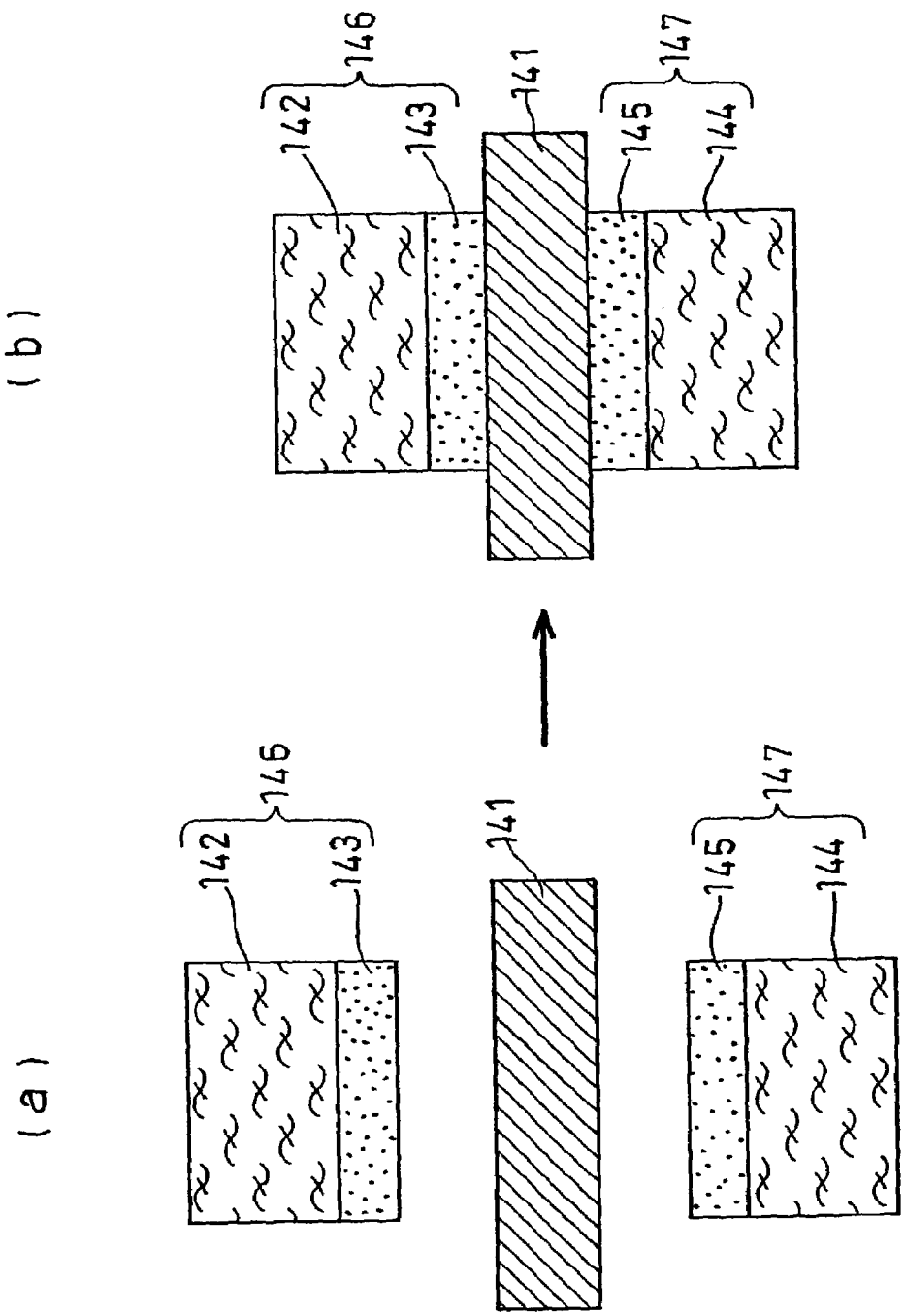
FIG. 10 is a vertical sectional view representing the production process of the electrolyte membrane-electrode assembly for a fuel cell in Comparative Example 2.

FIG. 10 schematically shows a production process of an electrolyte membrane-electrode assembly in accordance with the present comparative example.

The same method as that in Example 3 was conducted until formation of catalyst layers 143 and 145, on gas diffusion layers 142 and 144, to obtain gas diffusion electrodes 146 and 147.

Subsequently, Flemion SH50 (thickness: 50 μm) 141, produced by Asahi Glass Co., Ltd. as the polymer electrolyte membrane was interposed between the gas diffusion electrodes 146 and 147 with the catalyst layers 143 and 145 inwardly opposed to each other, the temperature was raised to 150° C. simultaneously with pressurization at 5 kgf/cm² with the use of a hot pressing machine and, after the temperature was raised to 150° C., hot pressing was conducted at 50 kgf/cm².

Using this assembly, a voltage was measured at 75° C. and at 0.7 A/cm² in the same manner as Example 3, to be 0.55 V. Namely, the obtained output power was 0.385 W/cm², which was lower compared to Example 3. This is due to the internal resistance of the polymer electrolyte membrane; in a membrane with a large film thickness, a large decrease in voltage occurs.

COMPARATIVE EXAMPLE 3

In the present comparative example, the polymer electrolyte solution was applied directly onto the catalyst layer 103 by the roll coater method. Other conditions were made the same as Example 3 and a gas diffusion electrode was produced.

Figure 11:
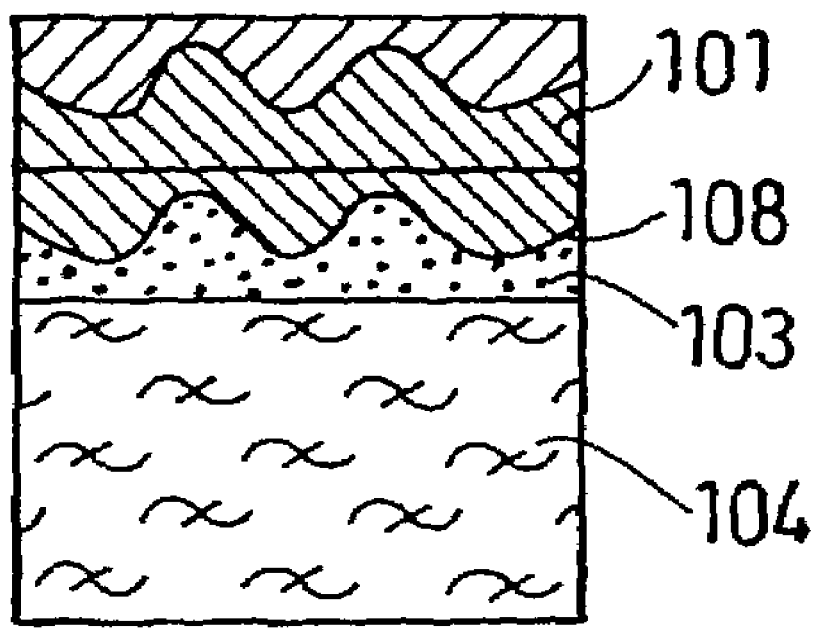
FIG. 11 is a vertical sectional view representing the production process of the electrolyte membrane-electrode assembly for a fuel cell in Comparative Example 3.

In the gas diffusion electrode as thus produced, the polymer electrolyte solution was infiltrated into the porous parts of the catalyst layer 103 at the time of the application and a boundary line 108 of the infiltrated polymer electrolyte solution appeared, as shown in FIG. 11. This led to generation of numerous small concavities and convexities on the surface of the polymer electrolyte membrane, and thus the thickness of the membrane was not uniform, with which the gas diffusiveness of the catalyst layer 103 did not function, and hence it could not be used as the electrode.

EXAMPLE 4

Figure 8:
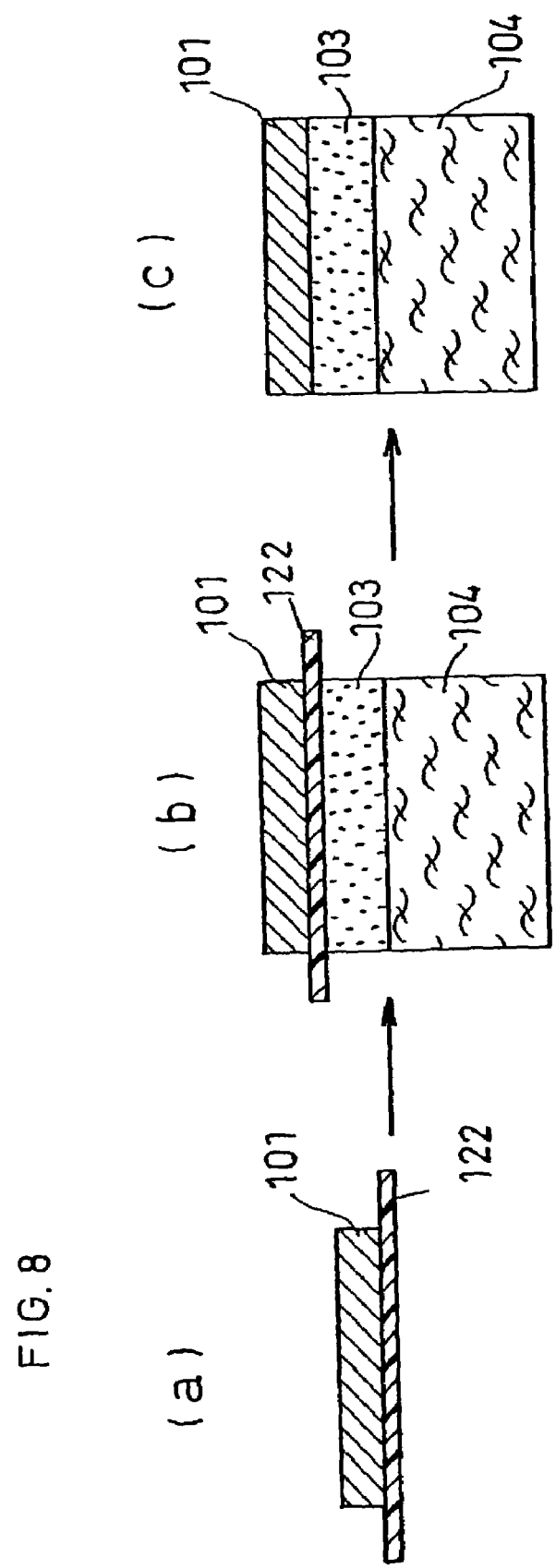
FIG. 8 is a vertical sectional view representing the production process of the electrolyte membrane-electrode assembly for a fuel cell in Example 4.

FIG. 8 schematically shows a production process of an electrolyte membrane-electrode assembly for a fuel cell in accordance with the present invention.

First, a gas diffusion electrode with the catalyst layer 103 was obtained in the same manner as in Example 3. Next, an aqueous solution with a concentration of 1% of hydroxypropyl methylcellulose (60SH4000 produced by Shin-Etsu Chemical Co., Ltd.) was dropped onto a glass plate to be developed by the casting method, followed by drying, to obtain a film 122.

After the Flemion FSS-1 solution as the polymer electrolyte was applied onto the film 122 by the roll coater method, an ethyl alcohol component was removed to obtain a film with the polymer electrolyte layer as in FIG. 8(a). At this time, the polymer electrolyte layer had a thickness of 12 μm.

Next, as shown in FIG. 8(b), this film with the polymer electrolyte layer was laminated with the above-produced gas diffusion electrode with the catalyst layer 103 and baked with the dryer in the condition of 200° C. for 30 minutes. This baking step allowed elimination of the film 122, resulting in obtainment of a gas diffusion electrode where the polymer electrolyte membrane 101 was in contact with the catalyst layer 103, as shown in FIG. 8(c).

The gas diffusion electrode with the polymer electrolyte layer as thus produced and the gas diffusion electrode with only the catalyst layer 103 were laminated such that the respective catalyst layer thereof such that the layers were inwardly opposed to each other as in Example 3, the temperature was raised to 150° C. simultaneously with the pressurization at 5 kgf/cm² with the use of a hot pressing machine and, after the temperature was raised to 150° C., hot pressing was conducted at 50 kgf/cm².

Using this assembly, a voltage was measured at 75° C. and at 0.7 A/cm², to be 0.69 V. Namely, the obtained output power was 0.48 W/cm², which was as high out put as that in Example 3.

EXAMPLE 5

FIG. 9 schematically shows a production process of an electrolyte membrane-electrode assembly for a fuel cell in accordance with the present example.

First, a gas diffusion electrode with the catalyst layer 103 was produced in the same manner as in Example 3. Then, this gas diffusion electrode with the catalyst layer was arranged onto a hot plate at 50° C. and an ethyl alcohol solution with 8 wt % of Flemion FSS-1 (a polymer electrolyte) was spray-applied with a spray nozzle 105 onto the catalyst layer of the gas diffusion electrode. First, 5 cc of Flemion FSS-1 solution was sprayed to the catalyst layer of the gas diffusion electrode at a distance of 80 cm or longer, ethyl alcohol as the solvent was evaporated with the solution on just the fall, resulting in formation by precipitation of a gelated layer on the surface of the catalyst layer. Next, 5 cc of Flemion FSS-1 solution was further sprayed uniformly to the gelated layer. After repetition of this operation three times, the gas diffusion electrode was stood still on the hot plate at 100° C. for 10 minutes to harden the gel as the polymer electrolyte, thereby forming a thin layer 131 of the polymer electrolyte. Thereafter, the Flemion FSS-1 solution was applied onto the thin layer 131 with the roll coater. Subsequently, the gas diffusion electrode with the polymer electrolyte membrane formed was dried at 150° C. for 60 minutes to obtain the gas diffusion electrode with the polymer electrolyte membrane, as in FIG. 9(c). The polymer electrolyte layer at this time had a thickness of 12 µm.

The gas diffusion electrode with the polymer electrolyte layer as thus produced and the gas diffusion electrode with only the catalyst layer 103 were laminated such that the respective catalyst layers were inwardly opposed to each other and, while pressurization at 5 kgf/cm² was conducted with the use of the hot pressing machine, the temperature was raised to 150° C., followed by hot pressing at 50 kgf/cm² after the temperature raise to 150° C.

Using this assembly, a voltage was measured at 0.7 A/cm² and at 75° C., to be 0.71 V. Namely, the obtained output power was 0.50 W/cm², which was as high out put as that in Example 3.

Although the roll coater method was employed in the present example, the similarly uniform coating layer and polymer electrolyte layer can be produced by the screen printing method.

REFERENCE EXAMPLE 1

First, 6.0 g of carbon fine powder carrying 25 wt % of platinum catalyst thereon was added to 50.0 g of n-butyl acetate ($CH_3COOCH_2(CH_2)_2CH_3$), which was stirred for 10 minutes with the use of a stirrer while being subjected to ultrasonic sound, to be dispersed. Next, the dispersion was added step by step with 40.0 g of ethanol solution with 9 wt % of a polymer electrolyte (Flemion produced by Asahi Glass Co., Ltd.), while being stirred, so that colloid of the polymer electrolyte was attached onto the surface of the carbon fine powder carrying the catalyst thereon. When the stirring was stopped one hour after addition of the entire polymer electrolyte solution, a clear supernatant liquid changed to be transparent. Subsequently, this mixed solution with the catalyst was mixed with 0.10 g of hexamethylene diamine, and ultrasonic soundly dispersed for one hour, to obtain a catalyst paste.

Next, it was soaked in a fluorocarbon resin dispersion (ND-1 produced by DAIKIN INDUSTRIES, LTD.), and then about 30 µm of the catalyst paste was applied onto a carbon paper substrate produced by Toray Industries, Inc. having been baked at 300° C.

Further, on both faces of a polymer electrolyte membrane having a film thickness of 50 µm (Flemion SH50 produced by Asahi Glass Co., Ltd.), the electrodes were hot pressed for 10 minutes at a temperature of 120 to 140° C. by applying pressure of 50 to 70 kg/cm² to produce an electrolyte membrane-electrode assembly.

This electrolyte membrane-electrode assembly was interposed between separators to assemble a unit cell, which was operated for 250 hours in such a condition as a cell temperature of 75° C., a hydrogen dew point of 70° C., an air dew point of 65° C., a hydrogen utilization ratio of 70%, an oxygen utilization ratio of 40% and a current density of 0.7 A/cm²; the voltage decreased by 0.03 V from the initial voltage of 0.65 V.

REFERENCE EXAMPLE 2

6.0 Gram of a carbon fine powder carrying 25 wt % of platinum catalyst thereon was added to 50.0 g of n-butyl acetate ($CH_3COOCH_2(CH_2)_2CH_3$), which was stirred for 10 minutes with the use of a stirrer while being subjected to ultrasonic sound, to be dispersed. Next, the dispersion was added step by step with 40.0 g of ethanol solution with 9 wt % of a polymer electrolyte (Flemion produced by Asahi Glass Co., Ltd.), while being stirred, so that colloid as the polymer electrolyte was attached onto the surface of the carbon fine powder carrying the catalyst thereon. After adding the entire polymer electrolyte solution, the stirring was further continued for one hour, to obtain a catalyst paste.

It was soaked into a fluorocarbon resin dispersion (ND-1 produced by DAIKIN INDUSTRIES, LTD.), and then about 30 µm of the catalyst paste was applied onto a carbon paper substrate produced by Toray Industries, Inc. having been baked at 300° C.

Further, on both faces of a polymer electrolyte membrane having a film thickness of 50 gm (Flemion SH50 produced by Asahi Glass Co., Ltd.), the electrodes were hot pressed for 10 minutes at a temperature of 120 to 140° C. by applying pressure of 50 to 70 kg/cm² to produce an electrolyte membrane-electrode assembly.

This cell was operated for 250 hours in the same condition as in Reference Example 1, to observe a voltage decrease by 0.12 V from the initial voltage of 0.67 V.

REFERENCE EXAMPLE 3

First, 7.0 g of carbon fine powder carrying 25 wt % of platinum catalyst thereon, 20 ml of ethanol, 1.0 g of hyxamethylene diamine were put into a three-necked flask and reflex for 10 minutes. This dispersion was filtrated, which was then sufficiently washed with ethanol and water through filter paper, followed by drying, to obtain a carbon fine powder carrying the platinum catalyst thereon with a part of the carboxyl groups on the surface amino-bonded to hyxamethylene diamine.

6.0 Gram of this carbon fine powder carrying the platinum catalyst thereon was added to 50.0 g of n-butyl acetate ($CH_3COOCH_2(CH_2)_2CH_3$), which was stirred for 10 minutes with the use of a stirrer while being subjected to ultrasonic sound, to be dispersed. Next, the dispersion was added step by step with 40.0 g of ethanol solution with 9 wt % of a polymer electrolyte (Flemion produced by Asahi Glass Co., Ltd.), while being stirred, so that colloid of the polymer electrolyte was attached onto the surface of the carbon fine powder carrying the catalyst thereon. After adding the entire polymer electrolyte solution, the stirring was further continued for one hour to obtain a catalyst paste.

Subsequently, in the same manner as in Reference Example 1, after it was soaked in a fluorocarbon resin dispersion (ND-1 produced by DAIKIN INDUSTRIES, LTD.), about 30 µm of the catalyst paste was applied onto a carbon paper substrate produced by Toray Industries, Inc. having been baked at 300° C.

Further, on both faces of a polymer electrolyte membrane having a film thickness of 50 µm (Flemion SH50 produced by Asahi Glass Co., Ltd.), the electrodes were hot pressed for 10 minutes at a temperature of 120 to 140° C. by applying pressure of 50 to 70 kg/cm² to produce an electrolyte membrane-electrode assembly.

This electrolyte membrane-electrode assembly was interposed between separators to obtain a unit cell, which was operated for 250 hours in the same condition as in Reference Example 1, to observe a voltage decrease by 0.04 from the initial voltage of 0.66 V.

REFERENCE EXAMPLE 4

0.05 Gram of hyxamethylene diamine was mixed into 40 ml of ethanol solution with 7 wt % of a polymer electrolyte (Flemion produced by Asahi Glass Co., Ltd.) and stirred with ultrasonic sound, which were put into a petri dish with a diameter of 12 cm and dried at room temperature all the day, followed by drying at 130° C. for two hours, to obtain a polymer electrolyte cast membrane with a thickness of 50 μm. This was interposed by carbon paper with a catalyst layer produced in exactly the same manner as in Comparative Example 1 to produce an electrolyte membrane-electrolyte assembly, thereby obtaining a unit cell.

This electrolyte membrane-electrode assembly was interposed between separators to assemble a unit cell, which was operated for 250 hours in the same condition as in Reference Example 1, to observe a voltage decrease by 0.05 from the initial voltage of 0.63 V.

It is to be noted that, although the catalyst paste was applied onto the carbon paper substrate to produce the gas diffusion electrode in Reference Examples 1 to 4 above, because the present invention is characterized in the compositions of the catalyst layer and/or the polymer electrolyte membrane, it goes without saying that the similar effect can exert in other production methods such as a method in which a catalyst paste obtained by dispersing a carbon fine powder carrying platinum thereon and a polymer electrolyte in ethanol is applied to a film made of polypropylene, Teflon or the like one time, which is then thermally transfer-printed onto a polymer electrolyte membrane to produce an electrolyte membrane-electrode assembly, and a method in which the catalyst paste is applied directly onto the polymer electrolyte membrane.

According to the present invention, a highly effective and reliable polymer electrolyte fuel cell of great power with low internal resistance can be obtained. Moreover, according to the present invention, an electrolyte membrane-electrode assembly, which is capable of using perfluorocarbon sulfonic acid ionomer with high proton conductivity and of excellent performance, has low internal resistance and is suitable for a low humidifying or no humidifying activation because an electrolyte membrane with a thin film thickness can be formed on a catalyst layer, and a PEFC can be obtained. Further, according to the present invention, an electrolyte membrane-electrode assembly using a polymer electrolyte which has high proton conductivity and excellent durability and exerts high performance, and a polymer electrolyte fuel cell constituted using the same can be obtained.

INDUSTRIAL APPLICABILITY

By combining the electrolyte membrane-electrode assembly obtained by the production method of the electrolyte membrane-electrode assembly for the polymer electrolyte fuel cell of the present invention with a separator, a current corrector, an end plate, a fastening rod, a manifold and the like, following the conventional method, a polymer electrolyte fuel cell excellent in cell characteristics can be obtained.

What is claimed is:

1. A production method of an electrolyte membrane-electrode assembly for a polymer electrolyte fuel cell, comprising: a gas diffusion electrode having a gas diffusion layer and a catalyst layer; and a hydrogen ion-conductive polymer electrolyte membrane bonded to said gas diffusion electrode, said method being characterized by comprising:
a step of forming a hydrogen ion-conductive polymer electrolyte membrane on a base material;
a treatment step of reducing adhesion force between said base material and said hydrogen ion-polymer electrolyte membrane;
a step of separating and removing said base material; and
a step of bonding a catalyst layer and a gas diffusion layer onto said hydrogen ion-conductive polymer electrolyte membrane.

2. The production method of an electrolyte membrane-electrode assembly for a polymer electrolyte fuel cell in accordance with claim 1, wherein said forming step comprises a step of transfer-printing said hydrogen ion-conductive polymer electrolyte membrane at least one time, and said hydrogen ion-conductive polymer electrolyte membrane is supported by said base material until an electrolyte membrane-electrode assembly is obtained.

3. The production method of an electrolyte membrane-electrode assembly for a polymer electrolyte fuel cell in accordance with claim 1, comprising:
a step (1) of forming a hydrogen ion-conductive polymer electrolyte membrane on a first base material and a second base material;
a step (2) of forming a catalyst layer on said hydrogen ion-conductive polymer electrolyte membrane formed on said base material;
a step (3) of attaching by pressure and bonding a gasket and a gas diffusion layer onto said hydrogen ion-conductive polymer electrolyte membrane and said catalyst layer on said base material;
a step (4) of separating and removing said base material to obtain a first semi-assembly and a second-semi assembly; and
a step (5) of attaching by pressure said first semi-assembly to said second semi-assembly while said hydrogen ion-conductive polymer electrolyte membranes thereof are mutually opposed to obtain an electrolyte membrane-electrode assembly,
wherein said method further comprises, between said steps (1) and (4), a treatment step of reducing adhesion force between said base material and said hydrogen ion-conductive polymer electrolyte membrane.

4. The production method of an electrolyte membrane-electrode assembly for a polymer electrolyte fuel cell in accordance with claim 1, comprising:
a step (I) of forming a catalyst layer on a first base material and a second base material;
a step (II) of forming a hydrogen ion-conductive polymer electrolyte membrane on said catalyst layer such that said membrane covers said catalyst layer formed on said base material and on the periphery of said catalyst layer;
a step (III) of attaching by pressure said first base material to said second base material while said hydrogen ion-conductive polymer electrolyte membranes thereof are mutually opposed to obtain a pre-assembly;
a step (IV) of separating and removing said first base material from said pre-assembly;
a step (V) of attaching by pressure a gas diffusion layer and a gasket onto said catalyst layer and said hydrogen ion-conductive polymer electrolyte membrane which are exposed by said step (IV);
a step (VI) of separating and removing said second base material from said pre-assembly; and
a step (VII) of attaching by pressure a gas diffusion layer and a gasket onto said catalyst layer and said hydrogen ion-conductive polymer electrolyte membrane which are exposed by said step (VI) to obtain an electrolyte membrane-electrode assembly,
wherein said method comprises, between said steps (II) and (IV) and/or said steps (IV) and (VII), a treatment step of reducing adhesion force between said base material and said hydrogen ion-conductive polymer electrolyte membrane.

5. The production method of an electrolyte membrane-electrode assembly for a polymer electrolyte fuel cell in accordance with claim 1, wherein said step of forming a hydrogen ion-conductive polymer electrolyte membrane on a base material is a step of transfer-printing a hydrogen ion-conductive polymer electrolyte membrane formed on a base material for transfer-printing, to said base material.

6. The production method of an electrolyte membrane-electrode assembly for a polymer electrolyte fuel cell in accordance with claim 1, wherein at least the surface of said base material is constituted of a material which reduces the adhesion property to said hydrogen ion-conductive polymer electrolyte membrane by heating, or a material which evaporates or sublimates by heating, and said treatment step is a step of heating said base material.

7. The production method of an electrolyte membrane-electrode assembly for a polymer electrolyte fuel cell in accordance with claim 1, wherein at least the surface of said base material is constituted of a material which reduces the adhesion property to said hydrogen ion-conductive polymer electrolyte membrane by cooling, and said treatment step is a step of cooling said base material.

8. The production method of an electrolyte membrane-electrode assembly for a polymer electrolyte fuel cell in accordance with claim 1, wherein at least the surface of said base material is constituted of a material which reduces the adhesion property to said hydrogen ion-conductive polymer electrolyte membrane by irradiating active light rays, or a material which evaporates or sublimates by irradiating active light rays, and said treatment step is a step of irradiating said base material with active light rays.

9. The production method of an electrolyte membrane-electrode assembly for a polymer electrolyte fuel cell in accordance with claim 1, wherein said base material comprises on the surface thereof an adhesion layer capable of dissolving in a solvent, and said treatment step is a step of bringing said base material in contact with a solvent.

10. The production method of an electrolyte membrane-electrode assembly for a polymer electrolyte fuel cell in accordance with claim 1, wherein said treatment step is a step of depressurizing or pressurizing the face opposite to the face of said base material with said hydrogen ion-conductive polymer electrolyte membrane formed.

11. The production method of an electrolyte membrane-electrode assembly for a polymer electrolyte fuel cell in accordance with claim 1, wherein said method comprises a step of arranging a reinforcing film made of a frame-shaped hydrogen ion-conductive film or gas diffusive film between said hydrogen ion-conductive polymer electrolyte membrane and said catalyst layer, between said catalyst layer and said gas diffusion layer or between said hydrogen ion-conductive polymer electrolyte membranes, in a clearance between said gasket and said gas diffusion electrode.

12. A production method of an electrolyte membrane-electrode assembly for a polymer electrolyte fuel cell, said electrolyte membrane-electrode assembly having: a hydrogen ion-conductive polymer electrolyte membrane; and a gas diffusion electrode which contains a catalyst layer and a gas diffusion layer and is bonded to both faces of said hydrogen ion-conductive polymer electrolyte membrane, said method being characterized by comprising:
a step of bonding a hydrogen ion-conductive polymer electrolyte membrane and a catalyst layer via a coating layer positioned between the membrane and the catalyst layer;
a step of removing said coating layer; and
a step of obtaining an electrolyte membrane-electrode assembly by forming a gas diffusion layer on said catalyst layer.

13. The production method of an electrolyte membrane-electrode assembly for a polymer electrolyte fuel cell in accordance with claim 12, wherein said method comprises:

a step (a1) of forming a coating layer on a catalyst layer;
a step (b1) of applying a hydrogen ion-conductive polymer electrolyte solution onto said coating layer;
a step (c1) of removing said coating layer to obtain an electrolyte membrane-catalyst layer assembly; and
a step (d1) of forming a gas diffusion layer on said catalyst layer.

14. The production method of an electrolyte membrane-electrode assembly for a polymer electrolyte fuel cell in accordance with claim 12, wherein said method comprises:
a step (a2) of forming a hydrogen ion-conductive polymer electrolyte membrane on the coating layer which comprises a polymer film;
a step (b2) of arranging said catalyst layer on said polymer film;
a step (c2) of removing said polymer film to obtain an electrolyte membrane-catalyst layer assembly; and
a step (d2) of forming said gas diffusion layer on said catalyst layer.

15. A production method of an electrolyte membrane-electrode assembly for a polymer electrolyte fuel cell comprising:
a first step of applying on a catalyst layer a coating layer raw material solution containing a hydrogen ion-conductive polymer electrolyte and a solvent, to form a liquid layer;
a second step of drying said liquid layer to remove said solvent to form a gelated layer;
a third step of drying said gelated layer to be solidified to form a coating layer;
a fourth step of applying on said coating layer a polymer electrolyte membrane raw material solution to form a polymer electrolyte membrane;
a fifth step of forming a gas diffusion layer on a side of said catalyst layer, where said coating layer is not formed, to form an assembly in which at least said catalyst layer is disposed between said polymer electrolyte membrane and said gas diffusion layer; and
a sixth step of heating said assembly to form an electrolyte membrane-electrode assembly.

16. The production method of an electrolyte membrane-electrode assembly for a polymer electrolyte fuel cell in accordance with claim 15,
wherein a concentration of said hydrogen ion-conductive polymer electrolyte in said gelated layer formed in said second step is 10 to 20 wt %.

17. The production method of an electrolyte membrane-electrode assembly for a polymer electrolyte fuel cell in accordance with claim 15,
wherein said second step is repeated plural times before said third step.

18. The production method of an electrolyte membrane-electrode assembly for a polymer electrolyte fuel cell in accordance with claim 15,
wherein said gelated layer is solidified at a temperature of 100 to 140° C. in said third step.

19. The production method of an electrolyte membrane-electrode assembly for a polymer electrolyte fuel cell in accordance with claim 15,
wherein said coating layer is integrated in said polymer electrolyte membrane in said electrolyte membrane-electrode assembly obtained after said sixth step.

* * * * *